United States Patent
Wu

(10) Patent No.: US 12,188,840 B1
(45) Date of Patent: Jan. 7, 2025

(54) REFRACTIVE PERISCOPE FOR EXTENDED-PUPIL PARALLELISM AND VIRTUAL IMAGING DISTANCE MEASUREMENTS

(71) Applicant: MLOptic Corp, Redmond, WA (US)

(72) Inventor: Pengfei Wu, Bellevue, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/647,481

(22) Filed: Apr. 26, 2024

Related U.S. Application Data

(63) Continuation-in-part of application No. 18/385,035, filed on Oct. 30, 2023, now Pat. No. 11,971,249.

(51) Int. Cl.
  *G01M 11/02* (2006.01)
  *G02B 27/00* (2006.01)

(52) U.S. Cl.
  CPC .... *G01M 11/0221* (2013.01); *G01M 11/0207* (2013.01); *G01M 11/0257* (2013.01); *G02B 27/0081* (2013.01)

(58) Field of Classification Search
  CPC ......... G01M 11/0221; G01M 11/0207; G01M 11/0257; G02B 27/0081

USPC ......................................................... 356/127
See application file for complete search history.

(56) References Cited

U.S. PATENT DOCUMENTS

| | | | | |
|---|---|---|---|---|
| 4,395,123 A | * | 7/1983 | Minott | G01D 5/30 356/520 |
| 5,291,334 A | * | 3/1994 | Wirth | G02B 3/02 359/435 |

* cited by examiner

*Primary Examiner* — Mohamed K Amara
*Assistant Examiner* — Omar H Nixon
(74) *Attorney, Agent, or Firm* — Jong Patent Firm; Cheng Ning Jong; Tracy P. Jong

(57) ABSTRACT

An optical system for measuring a parallelism of rays of a light emitter and virtual imaging distances (VIDs) of the light emitter, the optical system including an enclosure, a pair of apertures, and a lens system disposed between the front and rear end of the enclosure, wherein a first and second of the apertures allows a first and second set of rays into the enclosure to be disposed through the optical lens system to be cast on an imaging plane as a first and second spot, respectively, wherein a parallelism of the sets of rays is based on a correspondence of a distance between the spots with a distance between sets of rays and a VID of the light emitter is based at least in part on an offset of the imaging plane from the lens system focus position when the light emitter is not optically disposed at infinity.

9 Claims, 29 Drawing Sheets

Object-space Telecentric Lens

| Surface # | Radius of curvature (mm) | Thickness (mm) | Refractive index | Abbe number | Lens elements |
|---|---|---|---|---|---|
| 0 | Infinity | VID | | | Object |
| 1 | Infinity | 50.000 | Lateral offsets up to +/-15mm | | Stop |
| 2 (A1) | -214.638 | 5.000 | 1.569 | 71.304 | Singlet |
| 3 (A2) | -109.253 | 39.029 | | | |
| 4 (B1) | -33.768 | 10.000 | 1.755 | 52.322 | Doublet |
| 5 (B2) | -40.654 | 6.000 | 1.569 | 71.304 | |
| 6 (B3) | -39.417 | 24.025 | | | |
| 7 (C1) | 597.268 | 12.000 | 1.569 | 71.304 | Doublet |
| 8 (C2) | -39.615 | 2.000 | 1.755 | 52.322 | |
| 9 (C3) | 225.664 | 9.450 | | | |
| 10 (D1) | 157.323 | 10.000 | 1.569 | 71.304 | Singlet |
| 11 (D2) | -89.458 | BFL | | | |
| 12 | Infinity | | | | Image |

*FIG. 14*

Optical performance of lens system remains diffraction-limited under below conditions (different aperture sizes with broad VID range):

| Apertures (in diameter) | 5 mm | 4 mm | 3 mm | 2mm |
|---|---|---|---|---|
| Aperture distances (D) | 0-30 mm | 0-30 mm | 0-30 mm | 0-30mm |
| VID (in diopter) | -10D to +6D | -10D to +6D | -20D to +6D | -20D to +6D |
| VID (in mm) | 100mm to -167mm | 100mm to -167mm | 50mm to -167mm | 50mm to -167mm |

FIG. 24

Captured image

Source cropped image

| Preset | VID (diopter) | +6 | +4 | +2 | +1 | 0 |
|---|---|---|---|---|---|---|
|  | VID (mm) | -167 | -250 | -500 | -1000 | infinity |
|  | D (mm) | 30 | 30 | 30 | 30 | 30 |
| measured | meas. d/2 (mm) | -14.342 | -9.948 | -5.172 | -2.637 | 0 |
| calculated | cal. Δ (mm) | -171.998 | -119.302 | -62.026 | -31.024 | 0 |
| calculated | cal. VID (mm) | -166.696 | -249.798 | -500.274 | -1001.813 | infinity |

| Preset | VID (diopter) | -1 | -2 | -4 | -6 | -10 | -20 |
|---|---|---|---|---|---|---|---|
|  | VID (mm) | 1000 | 500 | 250 | 167 | 100 | 50 |
|  | D (mm) | 30 | 30 | 30 | 30 | 30 | 30 |
| measured | meas. d/2 (mm) | 2.759 | 5.635 | 11.781 | 18.475 | 34.167 | 92.926 |
| calculated | cal. Δ (mm) | 33.088 | 67.578 | 141.285 | 221.563 | 409.751 | 1115.024 |
| calculated | cal. VID (mm) | 999.458 | 500.299 | 250.487 | 167.499 | 100.421 | 50.468 |

FIG. 28

REFRACTIVE PERISCOPE FOR EXTENDED-PUPIL PARALLELISM AND VIRTUAL IMAGING DISTANCE MEASUREMENTS

PRIORITY CLAIM AND RELATED APPLICATIONS

This continuation-in-part application claims the benefit of priority from non-provisional application U.S. Ser. No. 18/385,035 filed Oct. 30, 2023. Said application is incorporated by reference in its entirety.

BACKGROUND OF THE INVENTION

1. The Field of the Invention

The present invention relates to a periscope useful for parallelism, virtual imaging distance (VID), and modulation transfer function (MTF) measurements. More specifically, the present invention is directed to a periscope useful for parallelism, VID, and MTF measurements using a refractive lens system.

2. Background Art

Exit Pupil Expansion (EPE) in extended reality (XR), e.g., augmented reality (AR) and virtual reality (VR) devices, refers to the enlargement of the exit pupil when viewing augmented content through the device. The exit pupil is a virtual aperture where light rays leave the XR display optics or eyepiece to enter the user's eyes. EPE is crucial for achieving a wide field of view (FOV) in XR devices. A larger exit pupil allows for more light rays to enter the user's eyes, resulting in a wider FOV and a more immersive XR experience. Users can see more augmented content without having to adjust the device or their viewing position constantly. Since each person may have a unique inter pupillary distance (IPD) and pupil sizes, a larger exit pupil offers more flexibility in terms of head movement and eye positioning while maintaining a clear view of the augmented content. Users can experience greater comfort and usability as they interact with XR applications, particularly during extended use sessions. EPE can help reduce eye strain and fatigue associated with prolonged XR usage. By providing a larger exit pupil, XR devices distribute light more evenly across the user's pupils, minimizing the need for constant refocusing and adjustment. A wider exit pupil contributes to a more immersive XR experience by allowing users to perceive the augmented content seamlessly integrated with its surrounding environment. This enhances the sense of presence and realism, making the XR interactions feel more natural and engaging.

Optical parallelism refers to the consistent alignment of optical rays from the same field angle to reach the user's eyes. It is extremely critical to maintain parallelism or the consistency of optical rays within the EPE in XR devices to ensure that virtual elements or information presented to the user through XR technology align correctly with the real world, creating a seamless and immersive experience. In addition, optical parallelism also imparts significant impacts on the optical imaging quality of XR devices since inconsistent rays can blur the ideal optical spot supported to be formed in the human eye. Many XR devices use waveguides, holographic gratings or other optical components to guide and project light onto the user's eyes. Maintaining parallelism within these optical systems is essential to avoid distortions, aberrations, or misalignments that can disrupt the XR experience. Parallel optical rays contribute to the overall image quality and clarity of the XR display. Misaligned rays can lead to distortions, aberrations, and reduced image sharpness. By preserving parallelism, XR devices can deliver high-quality visual content. XR devices need to be accurately calibrated to ensure that the virtual content aligns correctly with the user's FOV, depth perception, and physical environment. Maintaining optical ray parallelism is a prerequisite to enable precise alignment of a virtual scene's rays with the user's actual visual perception. This involves a combination of precise calibration, alignment, accurate tracking and rendering techniques. Optical ray parallelism can also relate to the tracking and sensing systems used in XR devices. These systems monitor the user's movements and adjust the virtual content in real time. Ensuring that the virtual rays remain parallel to the user's physical perspective helps maintain a consistent and responsive XR experience. Many XR applications involve overlaying digital information onto the user's view of the physical world. Parallel optical rays ensure that this overlay is accurate and properly aligned, enabling users to access information in a contextually relevant and intuitive manner. Parallel optical rays are especially critical for XR applications where precise alignment is essential, e.g., medical visualization, industrial maintenance, architectural design, and navigation assistance. In these contexts, misalignment could lead to serious consequences or errors.

There is several optical equipment that can be used for optical ray measurements in XR metrology, e.g., an optical collimator, a wavefront sensor or an interferometer. An optical collimator can produce a parallel beam of light while measuring the reflected light from a target. As such, it is very useful for optical alignment. It can also be used to directly measure incoming light rays from a device, e.g., an XR device, to assess the quality of beam collimation. However, an optical collimator has a single optical aperture and thus it can only measure a single beam of light rays, making it difficult to compare the ray parallelism of two beams or light rays from different locations, e.g., light emitted from different eye box locations or different areas within the EPE. Although it can scan different areas depending on the aperture size of the collimator, the motion is undesirable because it inevitably introduces errors. In addition, an optical collimator commonly comes with a small FOV, e.g., less than 1 degree, which is too small for XR applications.

A wavefront sensor is useful for measuring the shape and characteristics of an optical wavefront, and thus it is useful for obtaining the divergence of light rays. The technique for using a wavefront sensor is a relatively new technique for wavefront measurements based on a Shack-Hartmann sensor which combines a two-dimensional detector with a lenslet array, allowing direct wavefront measurements. Shack-Hartmann sensors were developed for adaptive optics and have been widely used in optical metrology and laser diagnostics. However, the Shack-Hartmann sensors have limited spatial resolution and may not be able to accurately measure small wavefront distortions. The sensors also need be pre-calibrated and routinely by an experienced person in order to correctly measure the optical wavefront, especially when the test environments have changed.

An interferometer uses the interference of superimposed electromagnetic waves to extract the phase and intensity information from an object under test. The equipment has been widely used in the measurements of microscopic displacements, refractive index changes and surface irregularities for inspections of optical components or systems in both science and industry. Similar to the wavefront sensor, it can also be used to measure the optical ray parallelism. However, it is very sensitive to the changes of test environments, such as vibration, movement, acoustic noise, air turbulence, temperature, and humidity. They also have a very small dynamic range for the measurements and are good only for measuring small changes rather than large range of measurements. The FOV is typically narrow as well, which limits their ability to observe larger angles. In addition, interferometers can be complex and difficult to set up and maintain, requiring specialized knowledge and technical skills. As such, most interferometers are expensive and bulky, especially those that have high sensitivity and spatial resolution.

All of the above devices and methods are useful for measuring optical rays from the whole FOV but they are unable to sample optical rays from different eye box locations or different pupils. In EPE devices, optical rays from the same field angle do not mean they are emitted from the same eye box locations. Therefore, it is very important to have an effective tool to measure and compare optical parallelism of rays from different eye boxes or pupils.

There exists a need for an optical system useful for measuring optical parallelism that is suitable for EPE devices to properly cover different eye box or pupil locations commensurate with XR devices.

SUMMARY OF THE INVENTION

In accordance with the present invention, there is provided an optical system for measuring a parallelism of light rays of a light emitter and virtual imaging distances (VIDs) of the light emitter, the optical system including:
 (a) an enclosure including a front end and a rear end;
 (b) a pair of apertures configured to be disposed on a front plane on the front end of the enclosure; and
 (c) a single optical lens system disposed between the front end and the rear end of the enclosure,
wherein a first aperture of the pair of apertures is configured to allow a first set of light rays into the enclosure to enter through a front face of the single optical lens system and to exit through a rear face of the single optical lens system to be cast on an imaging plane as a first spot and a second aperture of the pair of apertures is configured to allow a second set of light rays into the enclosure to enter through the front face of the single optical lens system and to exit through the rear face of the single optical lens system to be cast on the imaging plane as a second spot, the imaging plane being parallel to the front plane, wherein a parallelism of the first set of light rays with respect to the second set of light rays is based on a correspondence of a distance between the first spot and the second spot with a distance between the first set of light rays and the second set of light rays and a VID of the light emitter is based at least in part on an offset of the imaging plane from the focus position of the single optical lens system when the light emitter is not optically disposed at infinity.

In one embodiment, the single optical lens system includes two singlets and two doublets and an optical path configured to be formed in an order of a first of the two singlets, the two doublets and a second of the two singlets. In one embodiment, the imaging plane is an imaging plane of an image capture device. In one embodiment, the light emitter is a waveguide. In one embodiment, the waveguide is an exit pupil expansion device. In one embodiment, the image capture device includes a controller configured to receive an image of the first spot and the second spot, wherein the controller is configured to determine if the first spot and the second spot are disposed on a central plane of the optical system and a distance between the first spot and the second spot corresponds with a distance between the first set of light rays and the second set of light rays, if at least one of the first spot and the second spot is not disposed on the central plane, the first set of light rays and the second set of light rays are not disposed in parallel and if the distance between the first spot and the second spot does not correspond with the distance between the first set of light rays and the second set of light rays, the first set of light rays and the second set of light rays are not disposed in parallel. In one embodiment, at least one of the first set of light rays and the second set of light rays includes a crosshair shape embodied in at least one of said first spot and said second spot such that an angular deviation of at least one of the first set of light rays the second set of light rays is discernible on the imaging plane. In one embodiment, the optical lens system is configured to be object-space telecentric. In one embodiment, wherein the first set of light rays and the second set of rays of the light emitter cause virtual imaging distances and object distances ranging from −20 D to +6 D (50 mm to −167 mm).

An object of the present invention is to provide an apparatus useful for measuring optical parallelism in extended reality (XR) metrology.

Another object of the present invention is to provide an apparatus useful for measuring VIDs.

Another object of the present invention is to provide an apparatus useful for measuring optical parallelism in extended reality (XR) metrology and VIDs.

Another object of the present invention is to provide an apparatus useful for measuring MTFs.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 14 is a diagram depicting the optical design data for the present optical system;

FIG. 24 is a table summarizing various parameters under which the performance of the present refractive optical system remains diffraction-limited;

FIG. 28 depicts measurement results of object distances or VIDs compared to preset values.

PARTS LIST

2—optical system, e.g., periscope or periscope system
4—housing or enclosure
6—pupil or aperture
8—camera or image capture device
10—lens system
12—front principal plane
13—rear principal plane
14—imaging plane
16—central plane
18—intersection angle of two optical axes
20—device under test (DUT), e.g., exit pupil expansion (EPE) of waveguide
22—light ray coupling-in optics such as holographic grating, metasurface, micro/nano structures or prisms
24—controller
26—first set of light rays
28—second set of light rays
30—distant object
32—human eye
34—optical rays with a specific viewing angle
36—optical rays with another viewing angle
38—lens of extended reality (XR) device
40—reference port, e.g., reference exit port
42—lens system center axis
44—plane upon which apertures are disposed
46—focal point Particular Advantages of the Invention The present periscope enables parallelism tests to be conducted on XR devices, and in particular Exit Pupil Expansion (EPE) devices. The use of a single refractive optical system with two or more entrance pupils ensures the high precision and absolute stability of parallelism measurements, by eliminating any alignment issue or motion errors, e.g., when using a beam splitter to align and combine two channels or when using a motion stage to scan eye boxes. In addition, the diffraction-limited angular resolution offers the highest angular accuracy capable of discerning a slight angular and boresight deviation.

The present periscope enables parallelism tests to be conducted on XR devices as well as enabling measurements to be collected and used for obtaining virtual imaging distances (VIDs) of the XR devices. The present periscope allows lateral offsets to be used for measuring VIDs. Longitudinal offsets are always used in conventional methods including refocusing methods, interference methods or wavefront measurements. VID measurements using conventional methods have been challenging due to the small pupil size in XR devices. However, the use of lateral offsets and axial focal measurements can enhance the accuracy of VID measurements.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
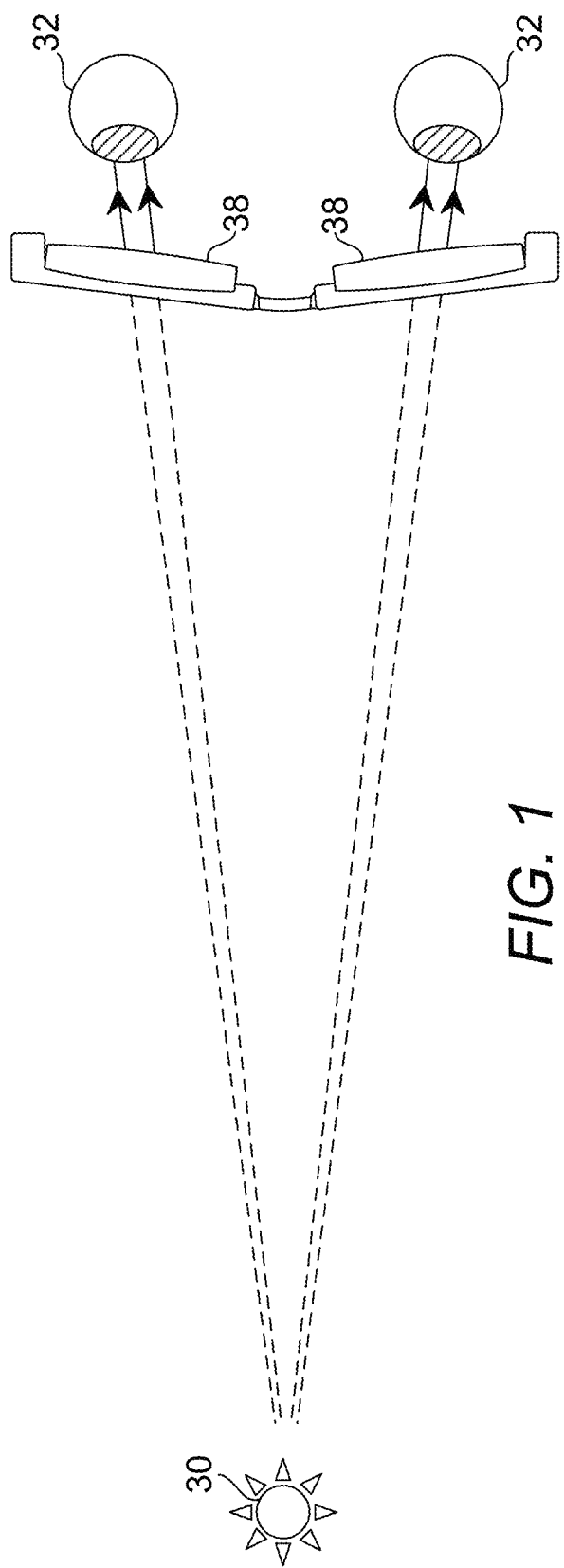
FIG. 1 depicts a scenario where virtual images are projected at a finite distance by an augmented reality (AR) device when an observer perceives optical rays via both eyes.

Depending on the virtual imaging distance (VID) of a virtual image projected by an extended reality (XR) device, an observer may perceive optical rays differently via both eyes compared to a single eye. When the XR device projects an object 30 far away or at infinity, optical rays are parallel to each of the two eyes. In this case, one or both eyes perceive optical rays similarly. However, when a projected object is closer to the observer, the two eyes of the observer see optical rays from the object with a vergence angle. In other words, the optical rays are not parallel between the two eyes, as shown in FIG. 1.

Figure 2:
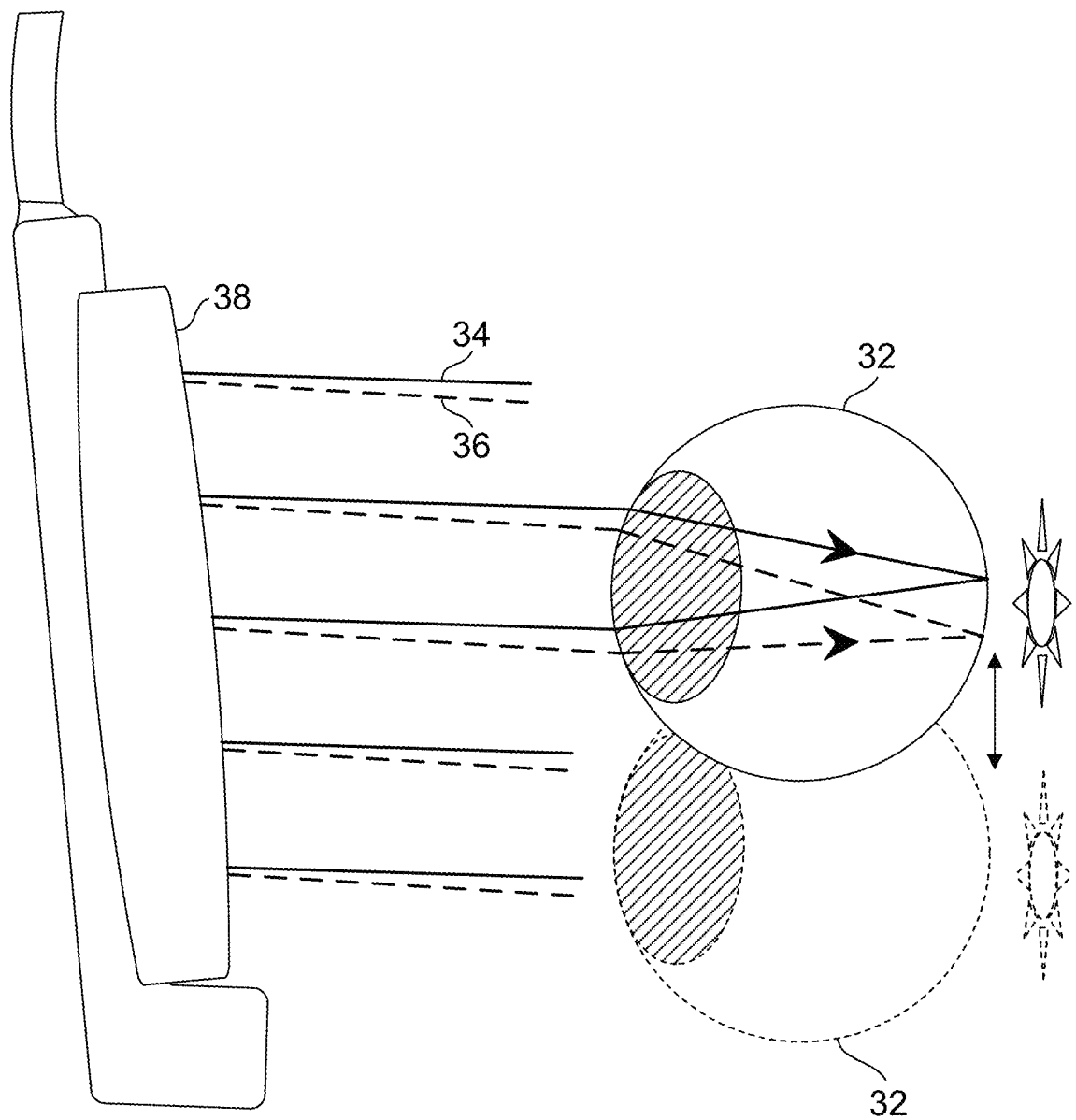
FIG. 2 depicts the parallelism of optical rays being maintained from the same viewing angle due to the exit pupil expansion (EPE) of a light emitter.

Due to the exit pupil expansion (EPE), however, optical rays from the same view angle are parallel within the single eye. For instance, all rays labelled 34 come from the same viewing direction or all rays labelled 36 also come from the same viewing direction as shown in FIG. 2 and each set 34, 36 of rays is parallel to the single eye. FIG. 2 depicts the parallelism of optical rays being maintained from the same viewing angle due to the exit pupil expansion (EPE) of a light emitter, e.g., a lens/waveguide 38, a pancake lens system, freeform optics of an XR device, light engines or micro-display modules, or any devices and systems that produce virtual images. It shall be noted that only one lens 38 is shown.

Figure 3:
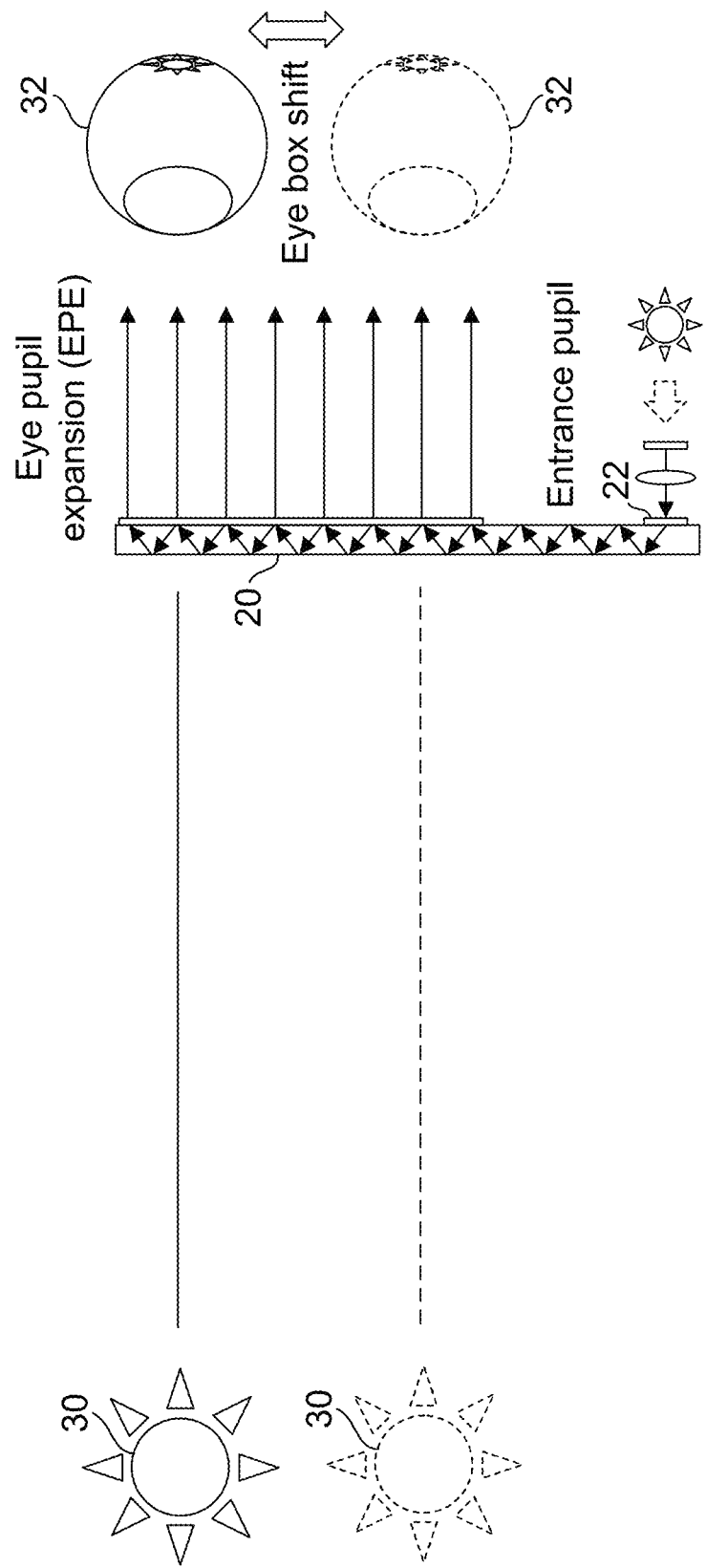
FIG. 3 depicts an eye of an observer which perceives the same virtual image even when the eye box position is slightly offset within the EPE.

FIG. 3 depicts an eye of an observer which perceives the same virtual image even when the eye box position is slightly offset within the EPE. Due to the EPE, the human eye 32 perceives exactly the same object even when the eye box position is slightly offset within the EPE when the human eye 32 moves across the width of the lens 38. The EPE feature is critical in XR technology and applications due to the frequent movements of human eyeballs and head as well as the interpupillary distance (IPD) differences between various people. An entrance port 22 of the waveguide receives light rays or images to be displayed on an EPE of a waveguide 20.

Figure 4:
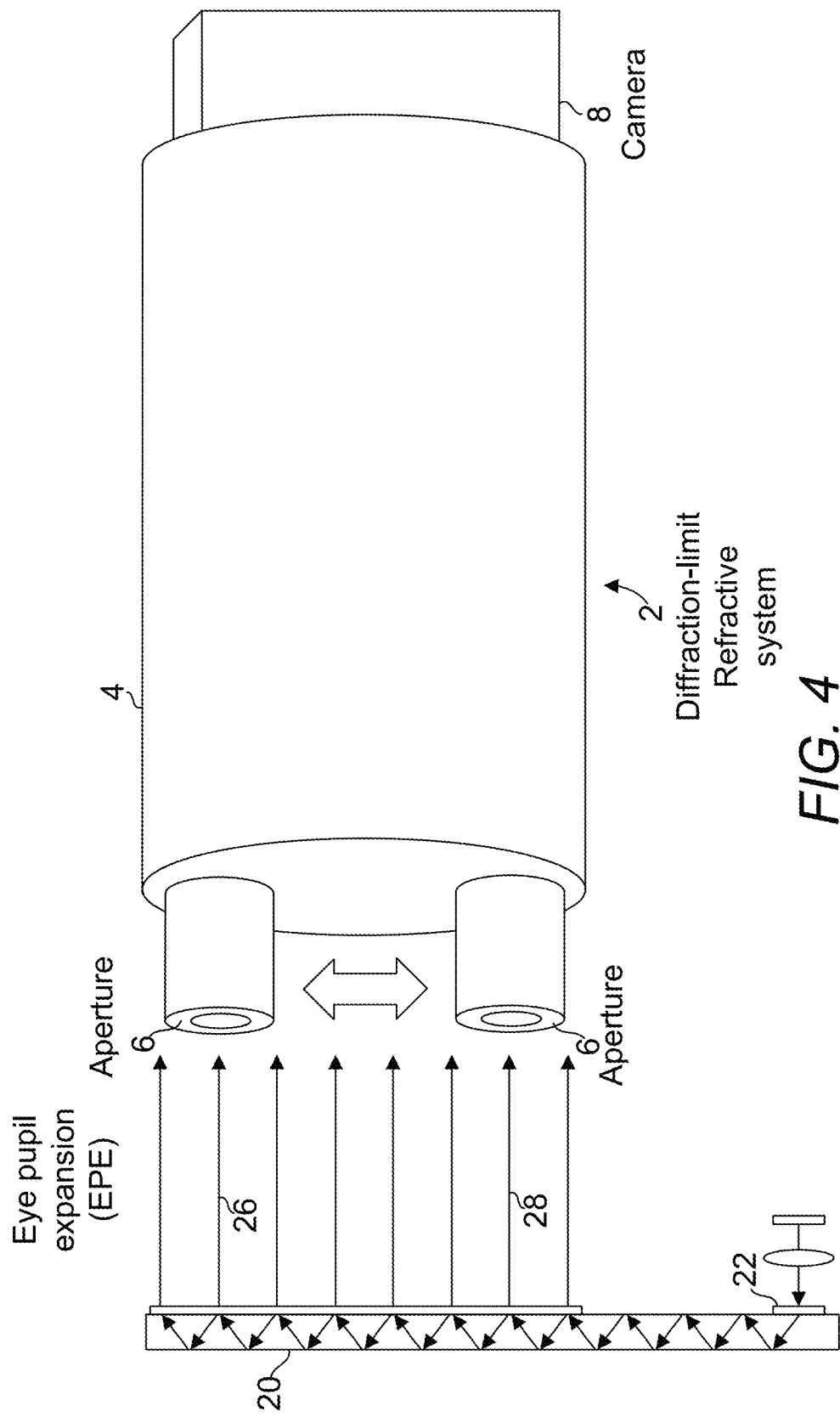
FIG. 4 is a diagram depicting a present refractive optical system useful for measuring and comparing optical rays from different areas of an EPE device.
Figure 5:
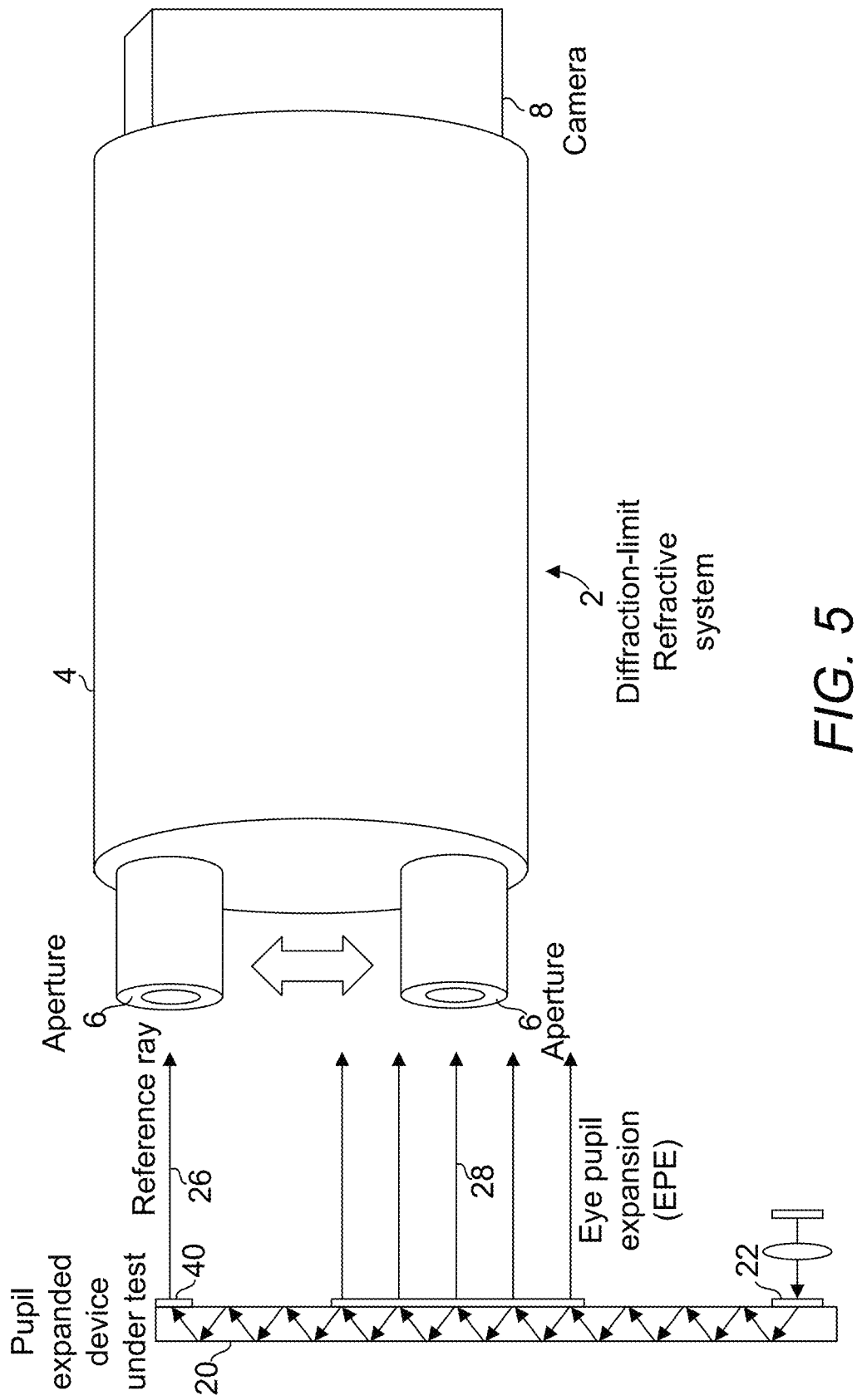
FIG. 5 is a diagram depicting a present refractive optical system useful for measuring and comparing optical rays between the EPE area and a reference exit port.

FIG. 4 is a diagram depicting a present refractive periscope 2 useful for measuring and comparing optical rays from different areas of an EPE device, e.g., a waveguide 20. FIG. 5 is a diagram depicting a present refractive periscope 2 useful for measuring and comparing optical rays between the EPE area and a reference exit port 40. These are two example devices under test (DUTs) or light emitters the present refractive periscope 2 is configured to test, with the apertures 6 of the periscope 2 disposed at a suitable distance, sufficient to receive two sets of light rays 26, 28. To evaluate extended-pupil parallelism, the EPE device is configured to project a parallel beam, which is equivalent to a point image at infinity, or a target pattern such as a crosshair at any virtual imaging distances. A periscope or periscope-like optical system can be used to select the optical rays from the EPE device at different areas of interest or different eye box locations and the optical rays are then compared to discern any angular or boresight deviations. Two or more apertures are required to sample the optical rays with adjustable aperture sizes and variable distances between apertures. Ideally, all optical rays are aligned in parallel when the VID is disposed at infinity. In this case, only one spot or crosshair is to be observed on the imaging plane of the periscope sensor. The angular resolution of the periscope is required to be diffraction-limited to ensure the effective detection of any possible misaligned optical rays.

Figure 6:
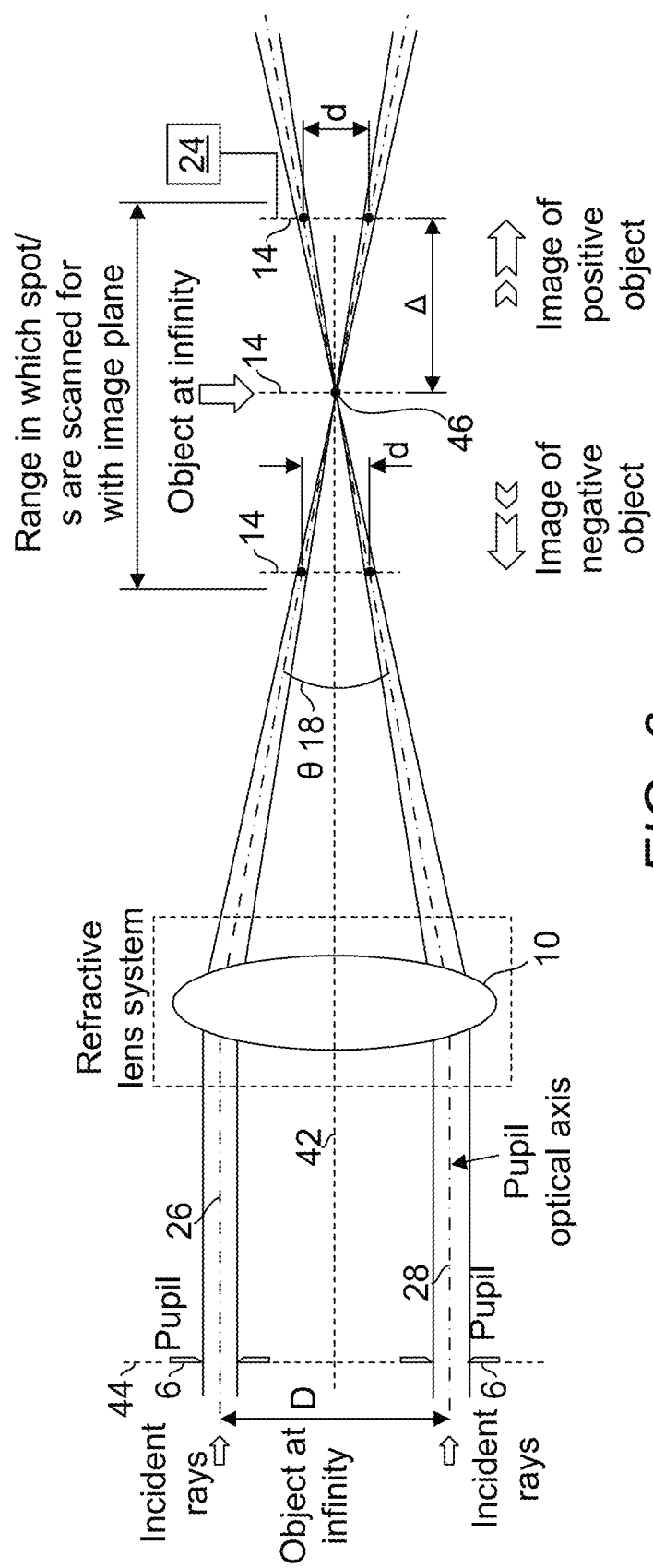
FIG. 6 is a diagram depicting a present refractive optical system based on a present optical system, e.g., a refractive periscope with two or more pupils when the incoming lights are received from an object disposed at infinity.
Figure 7:
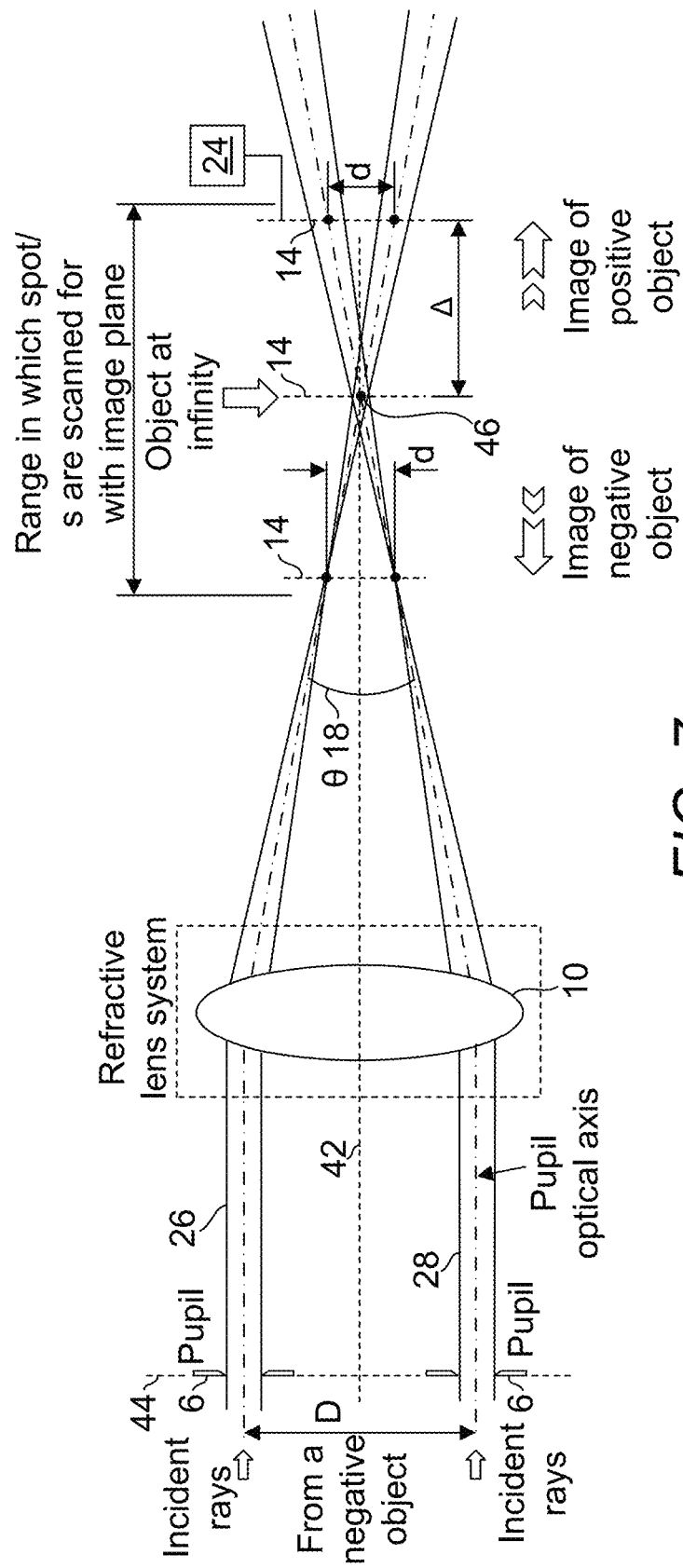
FIG. 7 is a diagram depicting a present refractive optical system based on a present optical system, e.g., a refractive periscope with two or more pupils when the incoming lights are received from a negative object.
Figure 8:
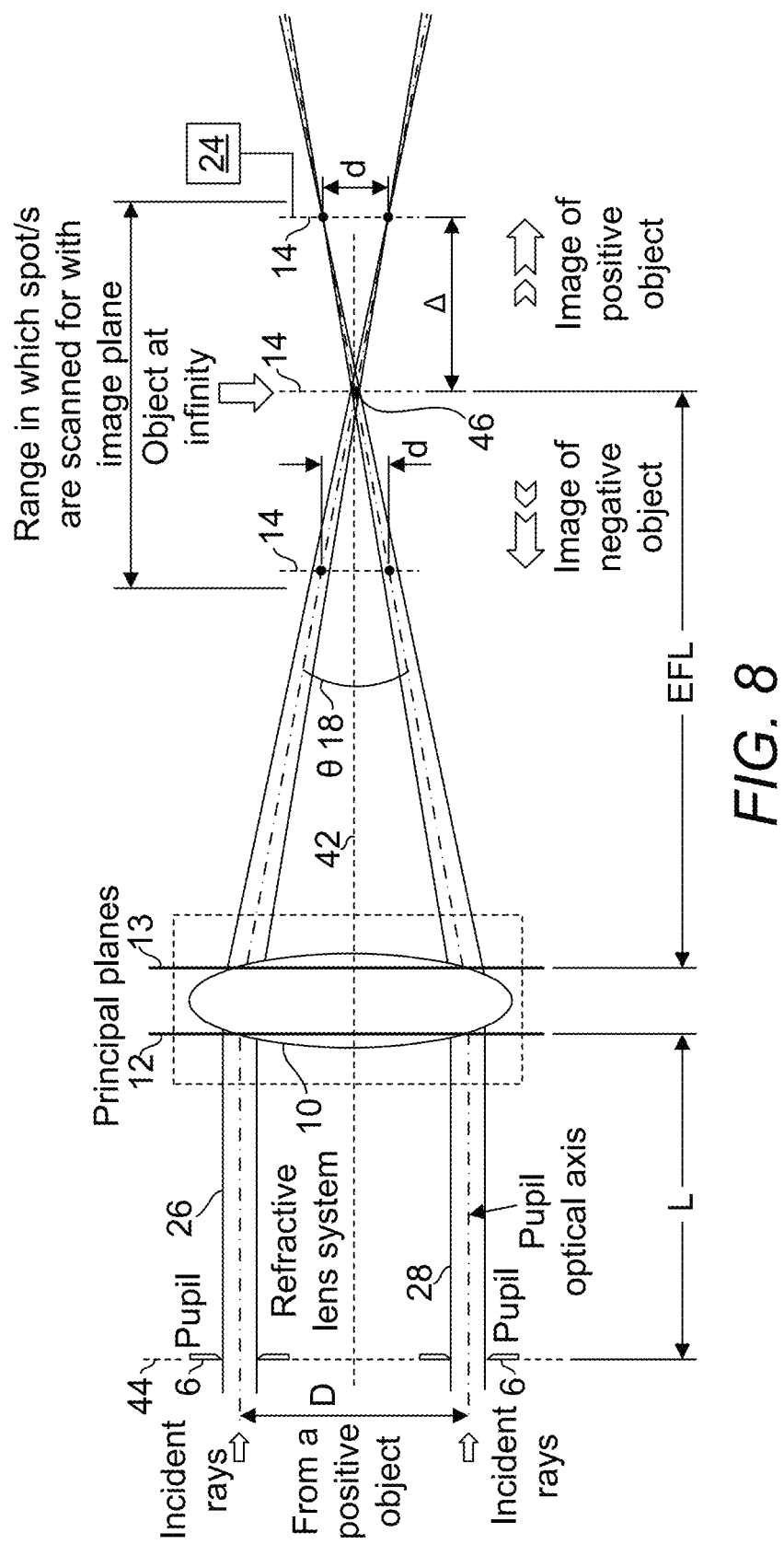
FIG. 8 is a diagram depicting a present refractive optical system based on a present optical system, e.g., a refractive periscope with two or more pupils when the incoming lights are received from a positive object.

FIG. 6 is a diagram depicting a present refractive optical system based on a present optical system, e.g., a refractive periscope with two or more pupils when the incoming light rays are received from an object disposed at infinity. FIG. 7 is a diagram depicting a present refractive optical system based on a present optical system, e.g., a refractive periscope with two or more pupils when the incoming lights are received from a negative object. FIG. 8 is a diagram depicting a present refractive optical system based on a present optical system, e.g., a refractive periscope with two or more pupils when the incoming light rays are received from a positive object. An object-telecentric optical lens system is required as the two or more pupils collect parallel optical chief rays. It is possible for the present refractive optical system to have one or more additional apertures or pupils 6 disposed equidistant to the lens system center axis 42 as those other pupils 6 along the same plane, i.e., plane 44, on which the pupils 6 are disposed, to allow the periscope to be set up for parallelism tests and to allow measurements to be taken for VID determination in cases where there is more than one DUT 20, a DUT with more than two EPE devices or a DUT with more than two sets of rays that are emitted at a time. The periscope 2 or optical system essentially includes an enclosure 4 including a front end and a rear end, a pair of apertures 6 configured to be disposed on the front end of the enclosure 4 on a central plane 16 (shown in FIG. 10), and a refractive lens system 10 disposed interior of the enclosure 4. A first aperture 6 of the pair of apertures 6 is configured to allow a first set of light rays into the enclosure 4 at a location of the lens system 10 before being redirected to be cast as a first spot on an imaging plane 14. A second aperture 6 of the pair of apertures 6 is configured to allow a second set of light rays into the enclosure 4 at another location of the lens system 10 before being redirected to be cast as a second spot on the imaging plane 14. Each aperture 6 of the pair of apertures 6 is configured to be variable in size, e.g., about 2-5 mm, using, e.g., a diaphragm mechanism, etc. The intersection angle 18 or θ, of two optical axes is defined as follows:

$$\theta = 2 \arctan(D/(2f)).$$ Equation (1):

Here, D is the distance between two pupil centers and f is the focal length of the refractive periscope 2. Since each pupil 6 is offset from the lens system center axis 42, an object will be imaged along the pupil axis, i.e., a dot dash line, rather than the lens system center axis 42. For an object at infinity, the optical rays are parallel and they will be focused to the same focal point 46 of the periscope 2 regardless of pupil location. For a positive or negative object with a certain object distance or a VID, the images are laterally separated when optical rays pass through different pupils. Assuming d is the separation distance between two imaging centers through different pupils for the same object distance, d can be defined as follows:

$$d=2\Delta \tan(\theta/2).\qquad\text{Equation (2):}$$

Here, Δ is the offset of an imaging plane 14 from the lens system focus position which intersects the focal point 46 when the object is not at infinity. In one embodiment, the imaging plane 14 is an imaging plane of an image capture device 8, e.g., a camera. In one embodiment, a controller 24 is functionally connected to a linear stage or another suitable positioner configured to manage the positioning of the imaging plane 14 and to position the imaging plane 14 at a location along lens system center axis 42 either manually or automatically. Based on imaging principles, Δ or an offset of the imaging plane 14 from the focus position of the lens system 10 when the light emitter or DUT is not optically disposed at infinity, can be resolved as follows:

$$\Delta=((VID*f)/(VID-f))-f=f^2/(VID-f),\qquad\text{Equation (3):}$$

where the term f is the focal length of the periscope. Therefore, in addition to parallelism measurements, a VID can be resolved using the present optical system based on either a lateral or axial offset of the image center or VID can be resolved as follows:

$$VID=(f*(f+\Delta))/\Delta.\qquad\text{Equation (4):}$$

Figure 9:
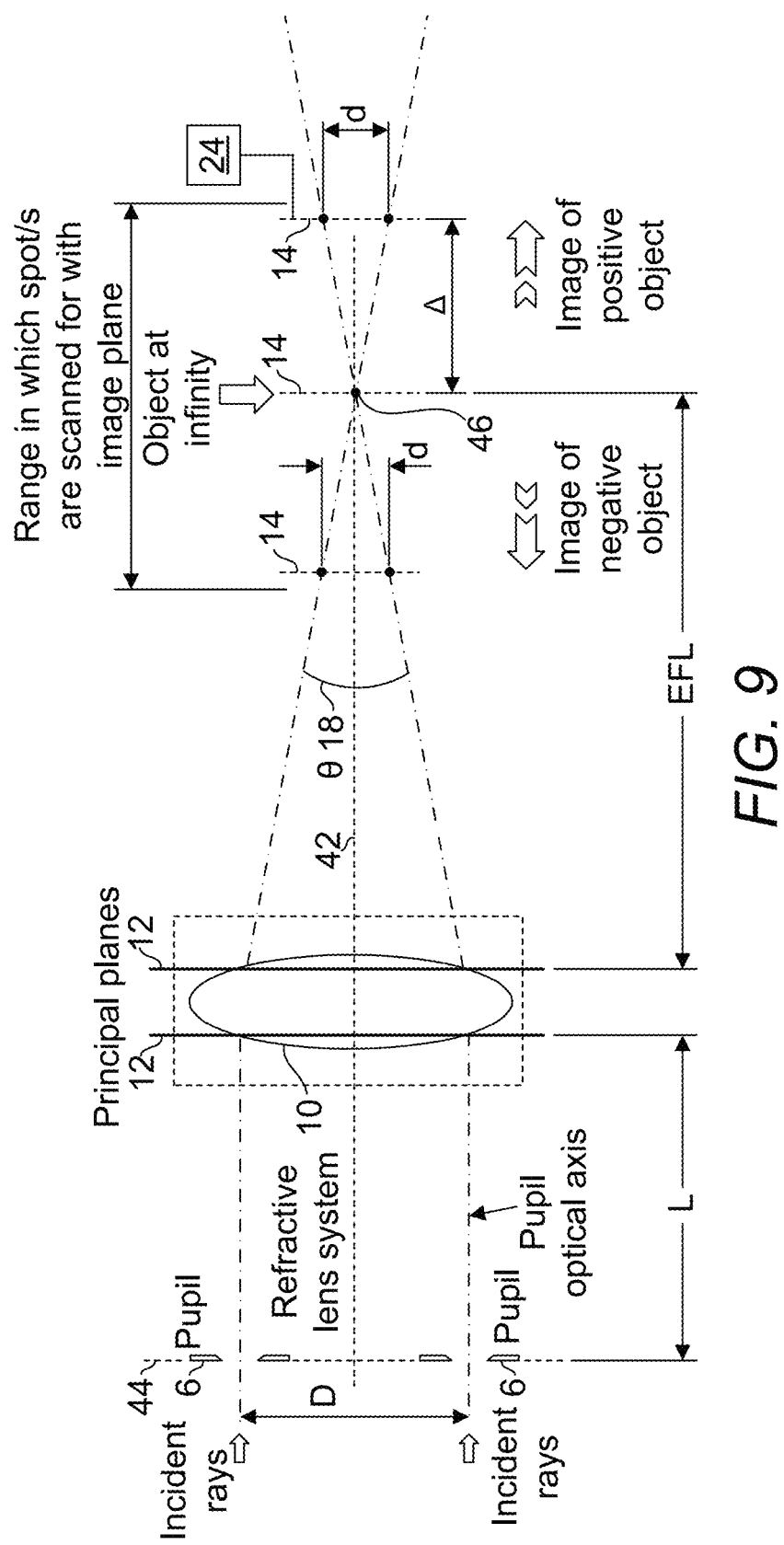
FIG. 9 is a diagram depicting one or more factors considered in determining a VID shorter than infinity and the parallelism between incoming sets of light rays.

Based on Equation (4), it shall be seen that VID is a function of Δ and thus d. FIG. 9 is a diagram depicting one or more factors considered in determining a VID shorter than infinity and the parallelism between incoming sets of light rays. For a long VID such as infinity, the above equation yields an accurate result. For shorter VIDs, the distance from the pupil plane 44 to the front principal plane 12 or the quantity L, is required to be considered.

So, the VID is required to be corrected as follows where VID' represents the correct VID:

$$VID'=VID-L.\qquad\text{Equation (5):}$$

Figure 10:
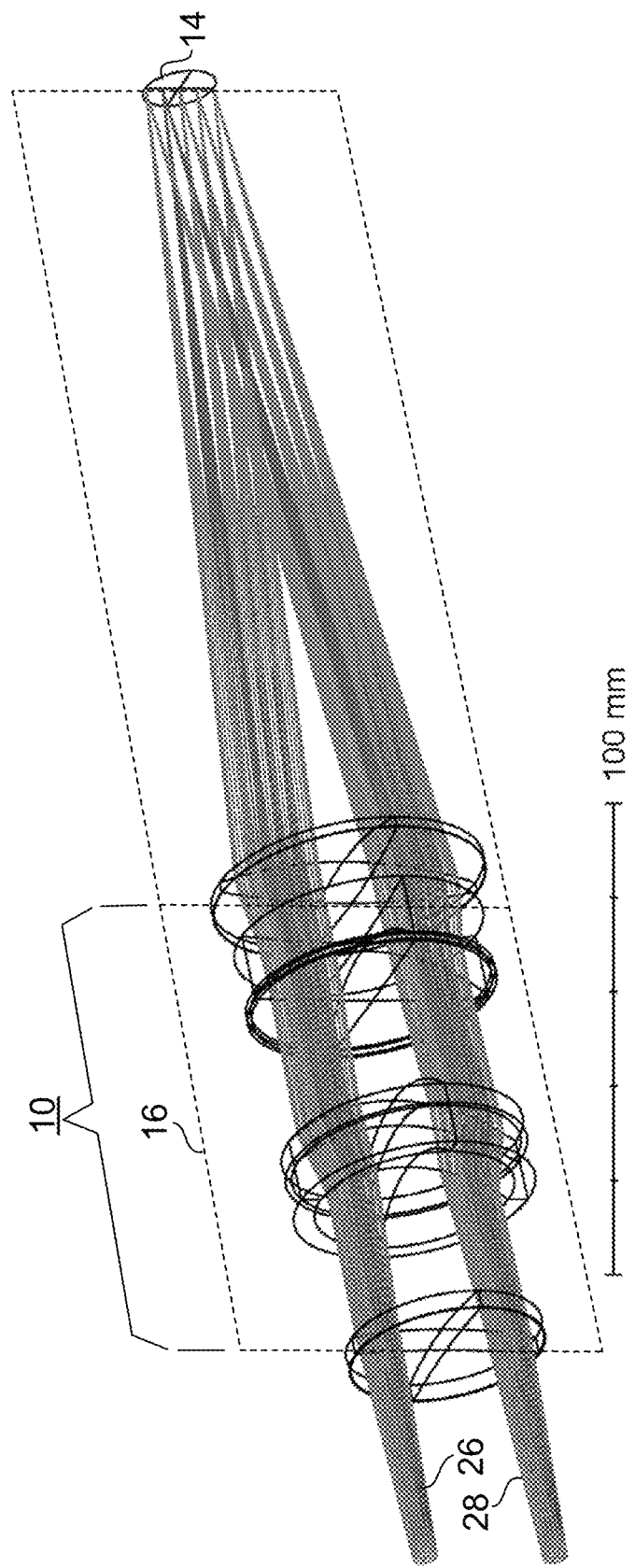
FIG. 10 is a top perspective view of the lens system of a present refractive optical system with a pair of pupils located within a central plane.
Figure 11:
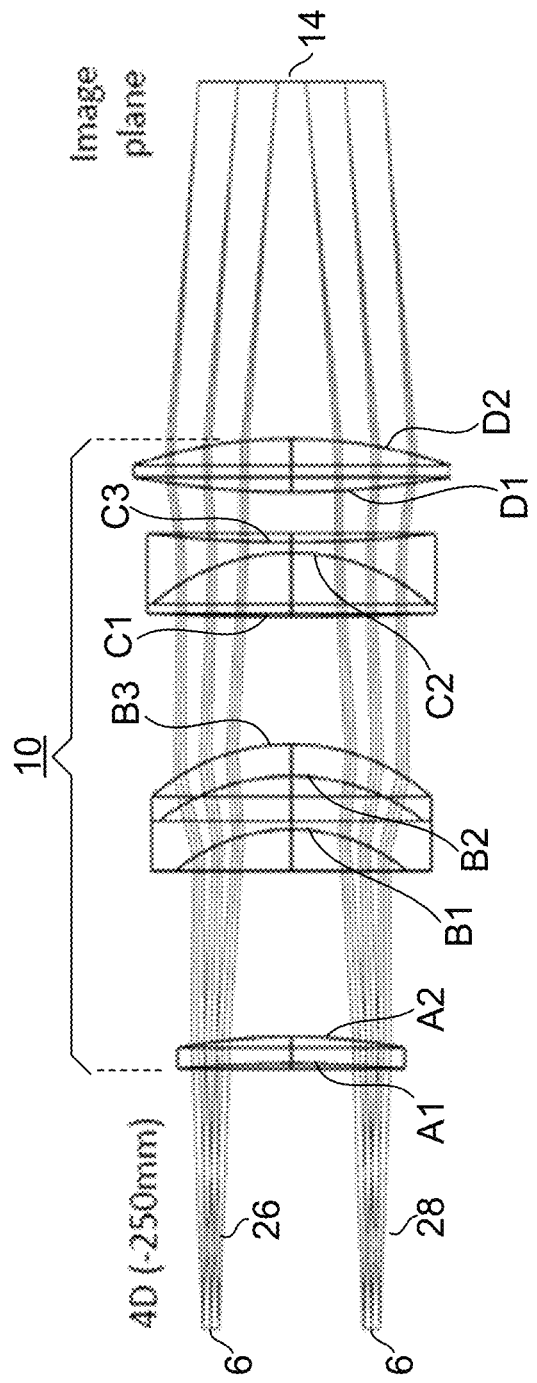
FIG. 11 depicts a lens system useful for a present refractive periscope in imaging a negative object.
Figure 12:
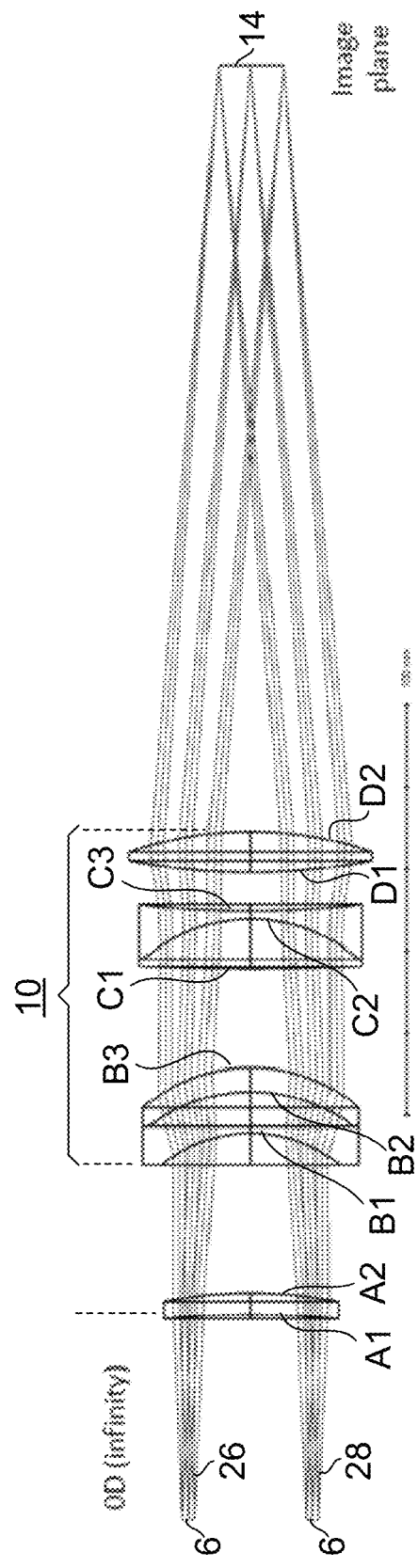
FIG. 12 depicts a lens system useful for a present refractive periscope in imaging an object disposed at infinity.
Figure 13:
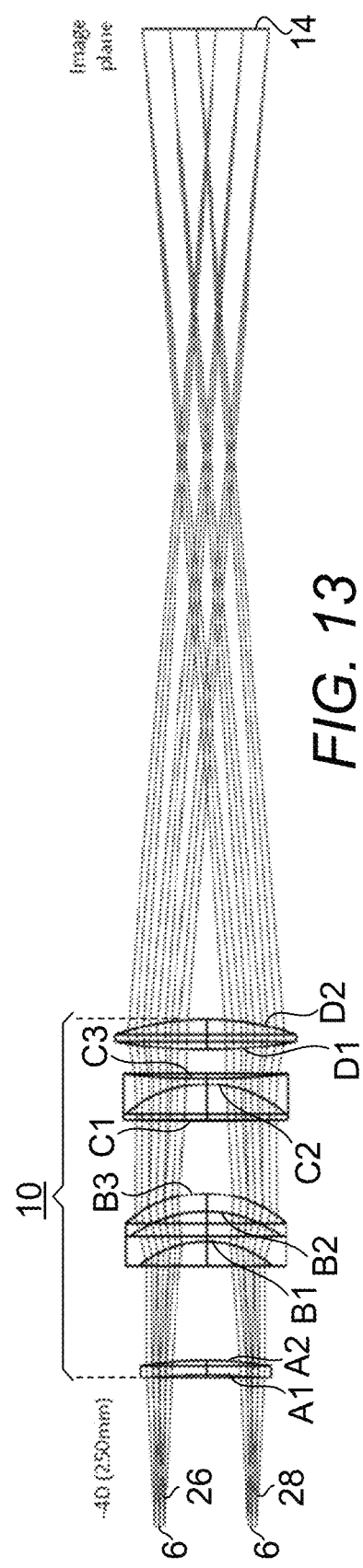
FIG. 13 depicts a lens system useful for a present refractive periscope in imaging a positive object.

FIG. 10 is a top perspective view of the lens system of a present refractive optical system with a pair of pupils located within a central plane 16. FIG. 11 depicts a lens system 10 useful for a present refractive periscope in imaging a negative object. FIG. 12 depicts a lens system 10 useful for a present refractive periscope in imaging an object disposed at infinity. FIG. 13 depicts a lens system 10 useful for a present refractive periscope in imaging a positive object. There are two apertures or stops where optical rays are sampled for measurements. The lens system includes only two glass types arranged symmetrically about the middle of the lens system.

FIG. 14 is a diagram depicting the optical design data for the present optical system. Compared to a conventional lens system, the present optical system has two or more apertures with diffraction-limited performance across all apertures and FOV as well as covering broad VID ranges. In one embodiment, the total length of the lens system is less than about 120 mm with a working distance, i.e., the entrance pupil to the first front lens, of about 50 mm, only four lens elements, i.e., two doublets with surfaces B1, B2, B3, C1, C2 and C3 and two singlets with surfaces A1, A2, D1 and D2, only two glass types and the lens system is compatible with specific requirements of the XR, Head-Up Display (HUD) and Near-Eye Display (NED) systems, making the present optical system very compact which is an important requirement for XR applications. The optical stop is placed in the front of the lens system to match human eye pupil.

Figure 15:
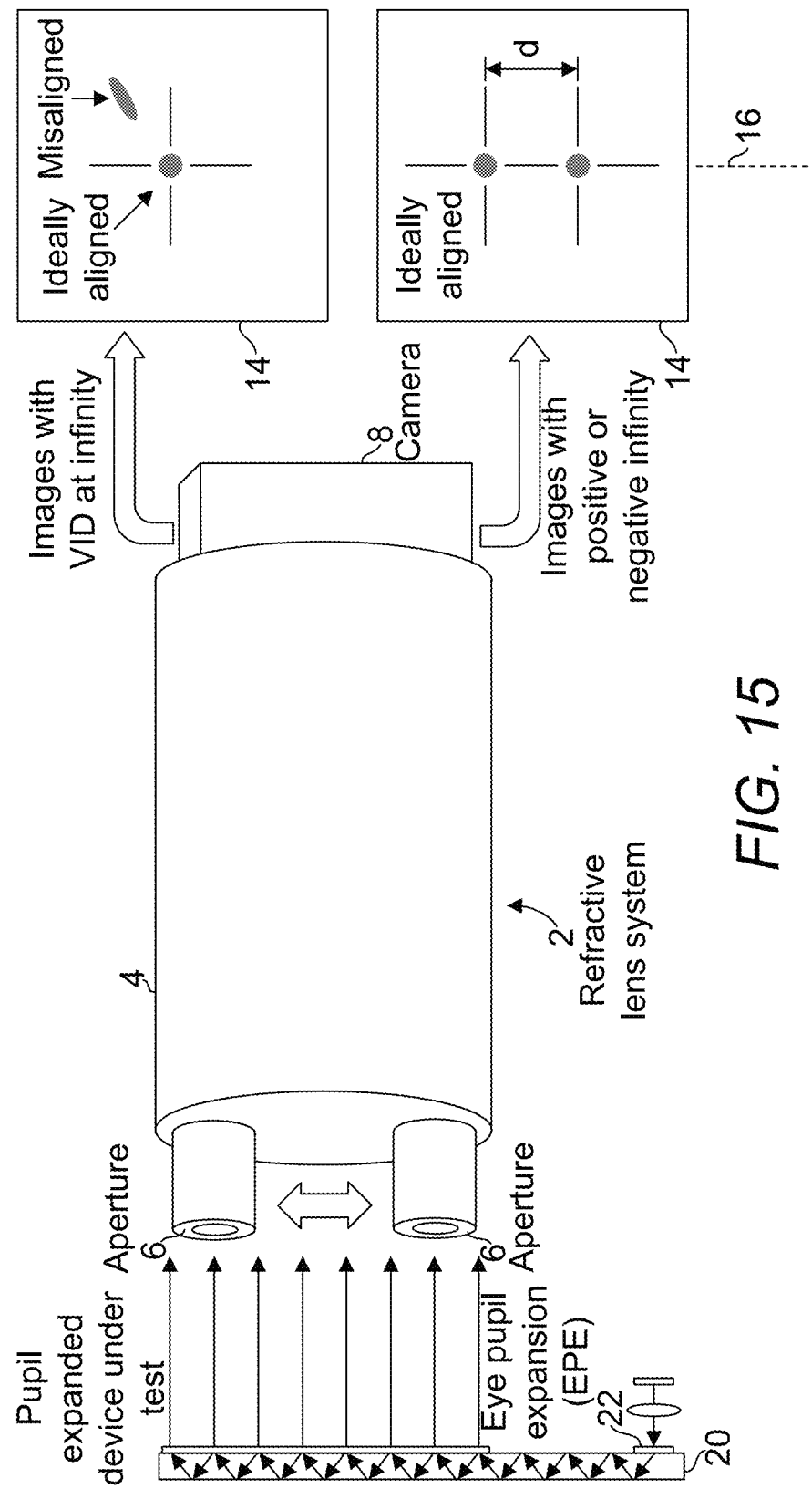
FIG. 15 is a diagram depicting a present optical system useful for determining the parallelism of incoming sets of light rays and the virtual imaging distance (VID) of the device under test (DUT) from which the incoming sets of light rays are emitted.
Figure 16:
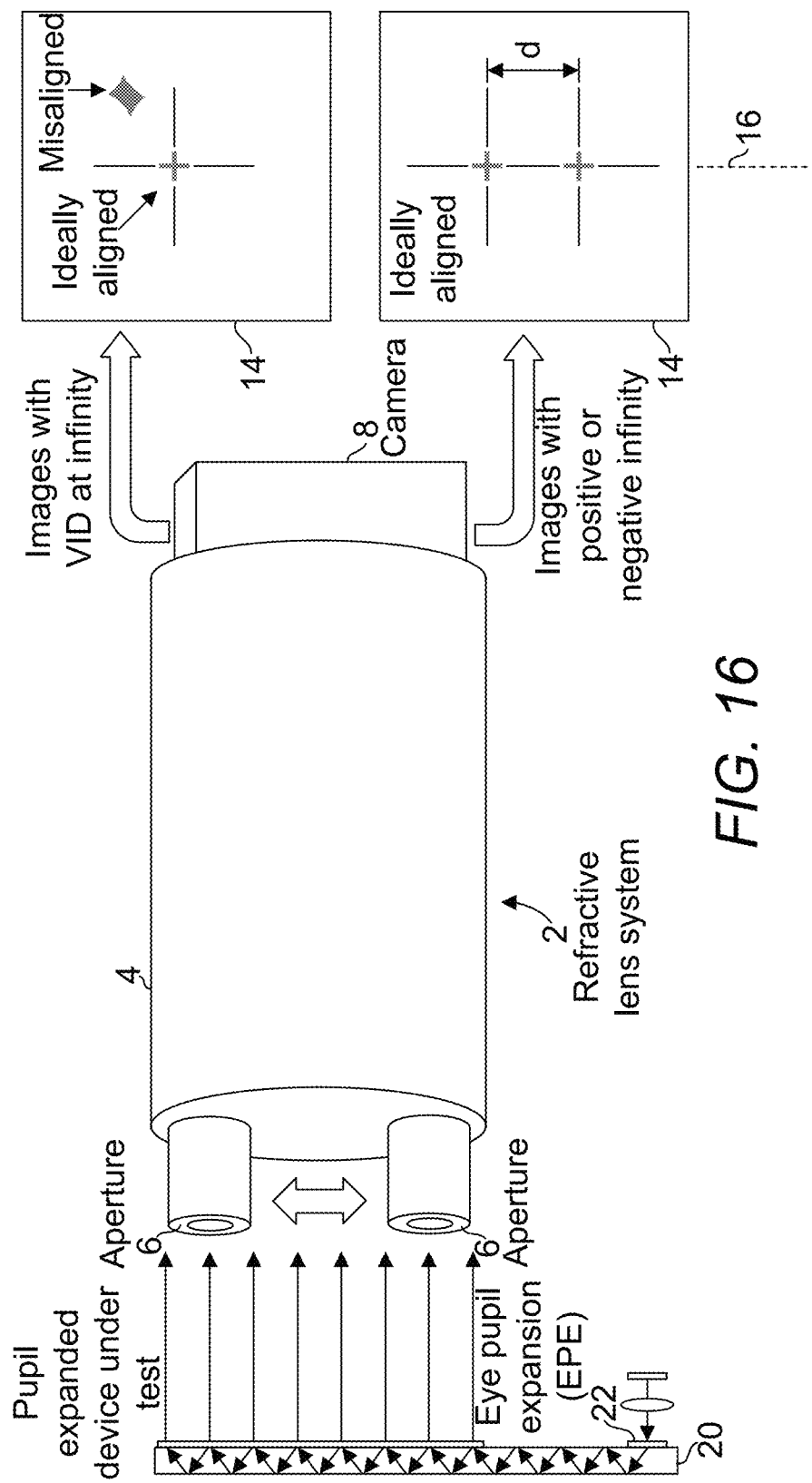
FIG. 16 is a diagram depicting a present optical system useful for determining the parallelism of incoming sets of light rays and the VID of the DUT from which the incoming sets of light rays are emitted.

FIG. 15 is a diagram depicting a present optical system useful for determining the parallelism of incoming sets of light rays and the VID of the DUT from which the incoming sets of light rays are emitted. The EPE device is configured to project a point image or a collimating light through each aperture of the present optical system 2. FIG. 16 is a diagram depicting a present optical system useful for determining the parallelism of incoming sets of light rays and the VID of the DUT from which the incoming sets of light rays are emitted. Here, again, the DUT is an EPE device and it is configured to project a crosshair object pattern for ease of angular measurements. Other patterns can also be used as long as the patterns indicate some form of orientation. An orientation-indicating pattern, e.g., a crosshair, can provide additional measurement information such as rotation misalignment where the crosshairs, each exhibited by a set of light rays, can be determined to be angularly rotated with respect the central plane 16 or the other crosshair. The crosshairs or another pattern, e.g., checkerboard pattern, can also be used to measure the point spread function (PSF) or modulation transfer function (MTF) as well as contrast ratio (CR), which are all important in determining the optical quality of the EPE devices. Referring back to FIG. 6-9, 11 as well as FIGS. 15 and 16, it shall be seen that various images may be cast on the imaging plane 14. In one embodiment, the image capture device 8 includes a controller 24 configured to receive an image of the first spot and the second spot. FIG. 15 shows the use of circular spots. The top right image depicts two sets of light rays that are not parallel as one of the spots is disposed to the upper right of a plane corresponding to the central plane 16 and the spot appears obscured or not round. The bottom right image depicts two sets of light rays that are parallel to one another as both of the spots are disposed along a plane that corresponds to the central plane 16 and the spots appear round and spread apart a distance d. FIG. 16 shows the use of crosshairs. Again, the top right image depicts two sets of light rays that are not parallel as one of the spots is disposed to the upper right of a plane corresponding to the central plane 16 and the spot appears obscured or an image of a distorted crosshair. The bottom right image depicts two sets of light rays that are parallel to one another as both of the spots are disposed along a plane that corresponds to the central plane 16 and the spots appear as crosshairs and spread apart a distance d. If at least one of the first spot and the second spot is not disposed on the central plane 16 or a plane corresponding to the central plane 16, the first set of light rays and the second set of light rays are determined to not be disposed parallel to one another. In a present optical system 2, as the parameters of the components and their locations are known, for every d, i.e., the distance between the first spot and the second spot, there is a corresponding value for D, i.e., the distance between the first set of light rays and the second set of light rays. The parameters d and D are related through Equations (1) and (2). For a D value, there can be multiple d values. Given a d value, a D value can be computed. As the D value is fixed, i.e., the distance between the center of the first set of light rays and the center of the second set of light rays, a computed D value which deviates from the fixed value is deemed to occur when d does not correspond with D. Therefore, if d does not correspond or agree with D, the first set of light rays and the second set of light rays are said to not be disposed parallel to one another. In one embodiment, the controller 24 is configured to determine if the first spot and the second spot are disposed on a central plane 16 of the optical system 2 and if a distance between the first spot and the second spot or d, corresponds with a distance between the first set of light rays and the second set of light rays or D. A spot may be detected when an image captured by the image capture device 8 is scanned for a round feature as in FIG. 15 or a crosshair feature as in FIG. 16. This determination may also be performed manually by a technician who adjusts, determines and selects the position of the imaging plane 14 at which the sharpest spots may be obtained. As disclosed elsewhere herein, the selection of the position along the lens system center axis 42 at which spot images are obtained for parallelism and/or VID determination may be performed manually or automatically. If automatic positioning of the imaging plane 14 is desired, the spots are scanned automatically along the lens system center axis 42 for when they form the clearest or sharpest spots on the imaging plane 14 before an image at this position is obtained for further determination of parallelism between the sets of rays and/or the VID.

The present optical system includes several critical features required for XR metrology, e.g., an effective focal length (EFL) of about 180 mm, angular FOV of about 5 degrees, RGB broad band spectra, entrance pupil sizes of about 2-5 mm, a single optical lens system with two apertures to ensure the absolute accuracy of measurements, a diffraction-limited angular resolution to provide the highest angular accuracy capable of discerning slight angular and boresight deviation.

Figure 17:
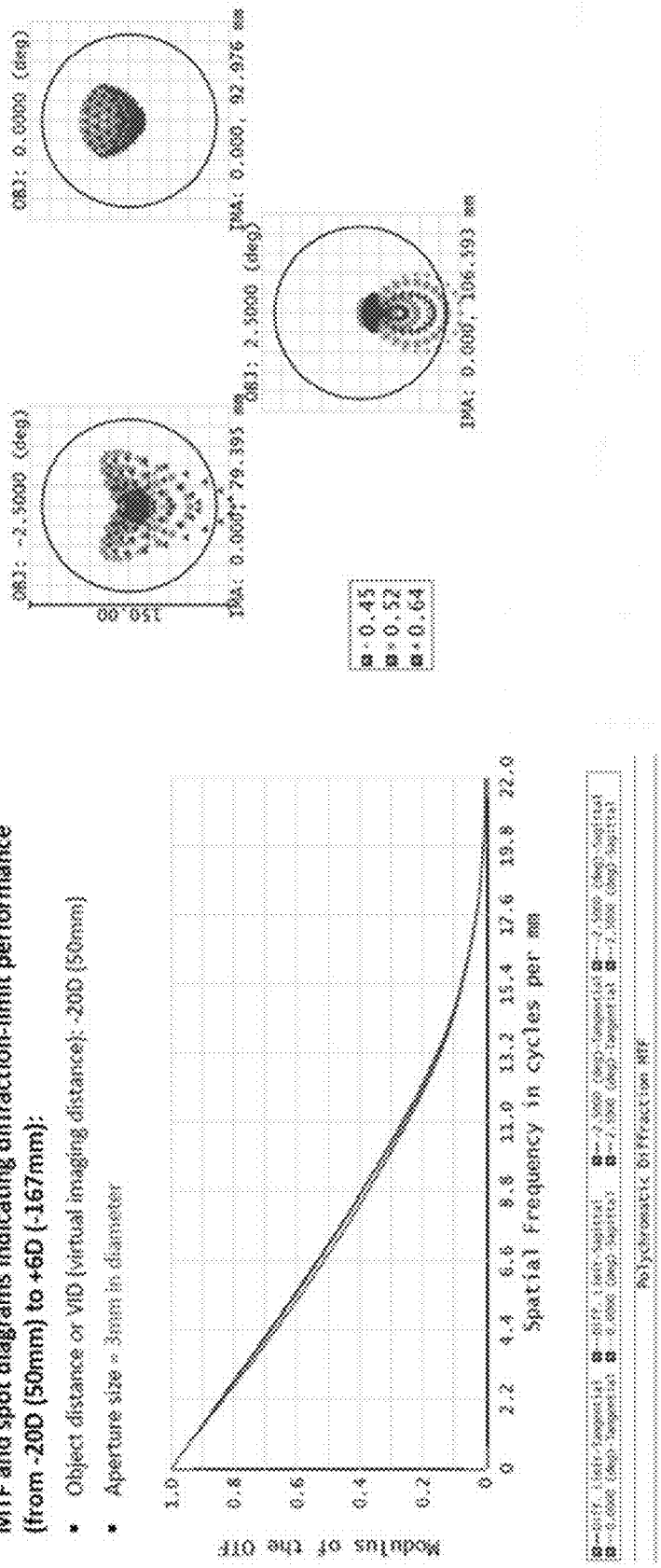
FIG. 17 is a diagram depicting the modulation transfer function (MTF) and spot diagrams with Airy disc (black circles) indicating diffraction-limit performance at D=30 mm, VID=−20 D and aperture=3 mm in diameter, of the present optical system.
Figure 18:
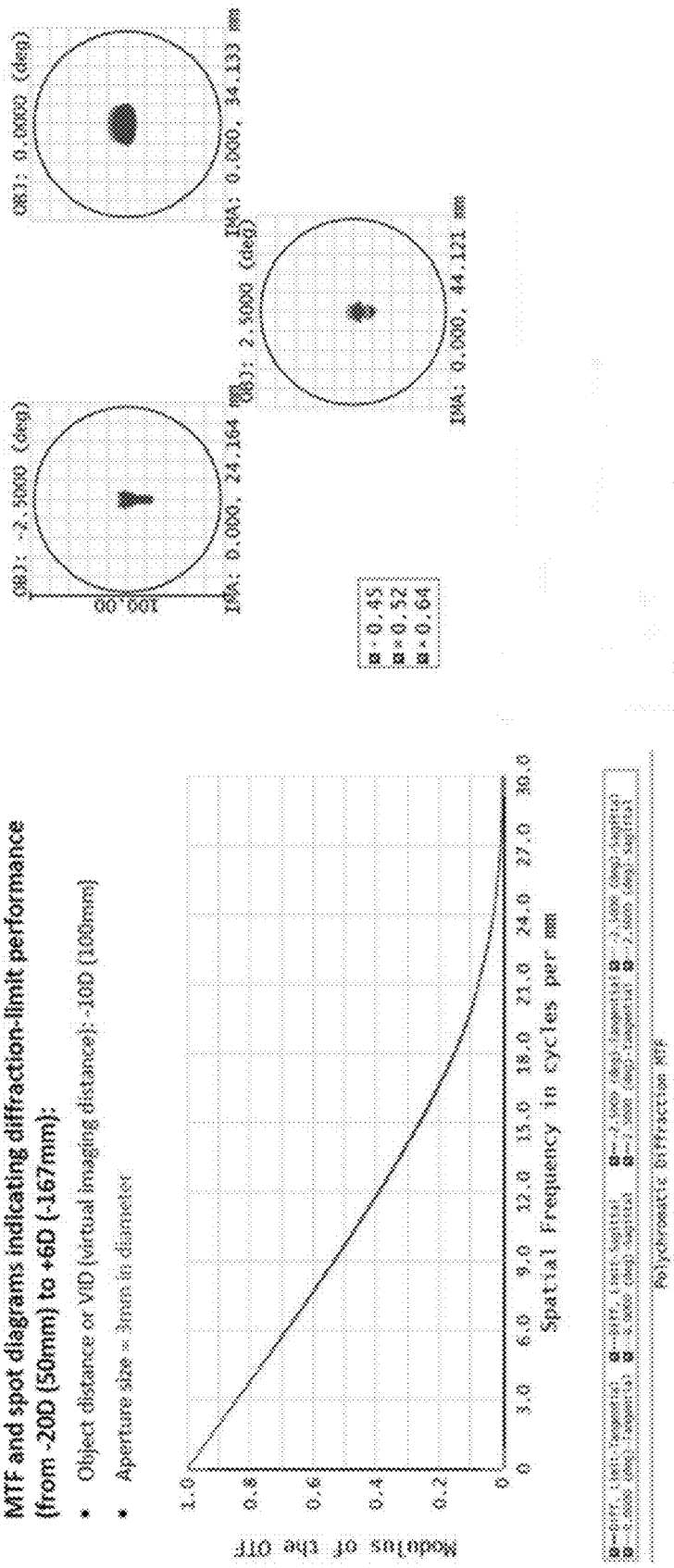
FIG. 18 is a diagram depicting the MTF and spot diagrams with Airy disc (black circles) indicating diffraction-limit performance at D=30 mm, VID=−10 D and aperture=3 mm in diameter, of the present optical system.
Figure 19:
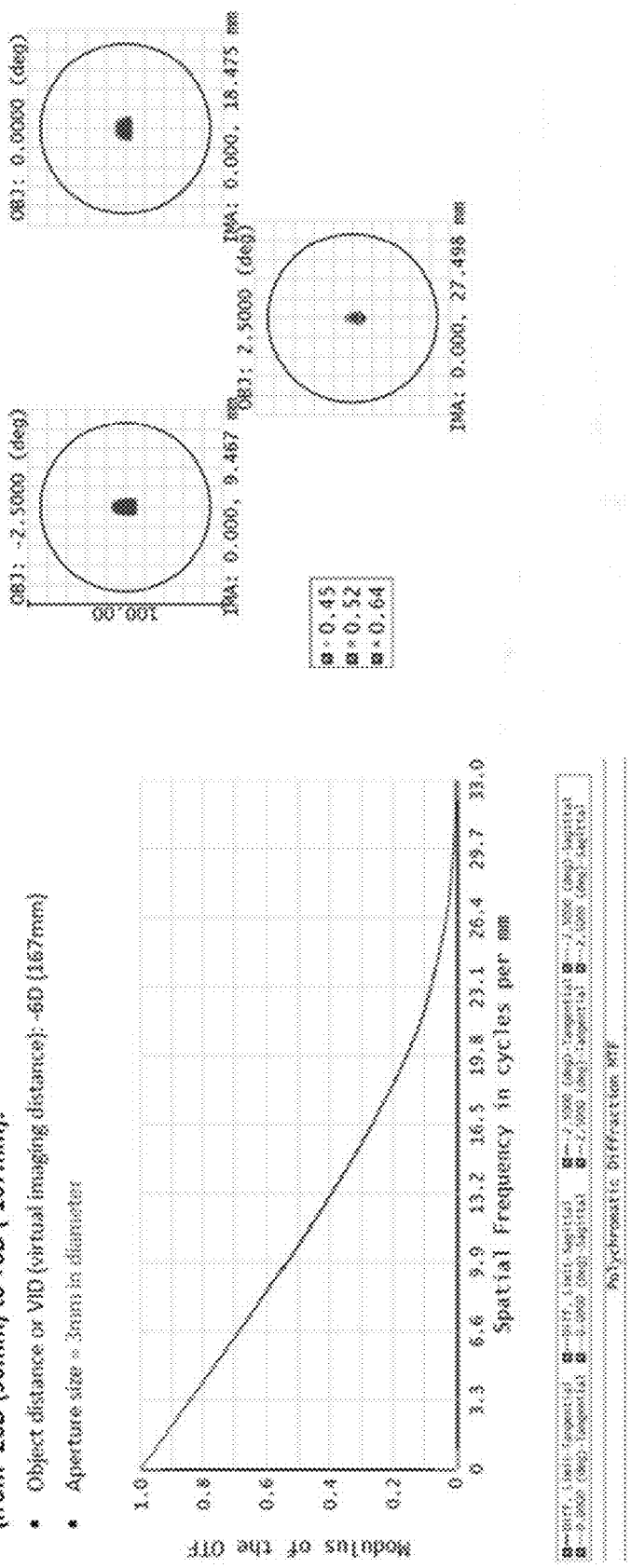
FIG. 19 is a diagram depicting the MTF and spot diagrams with Airy disc (black circles) indicating diffraction-limit performance at D=30 mm, VID=−6 D and aperture=3 mm in diameter, of a present optical system.
Figure 20:
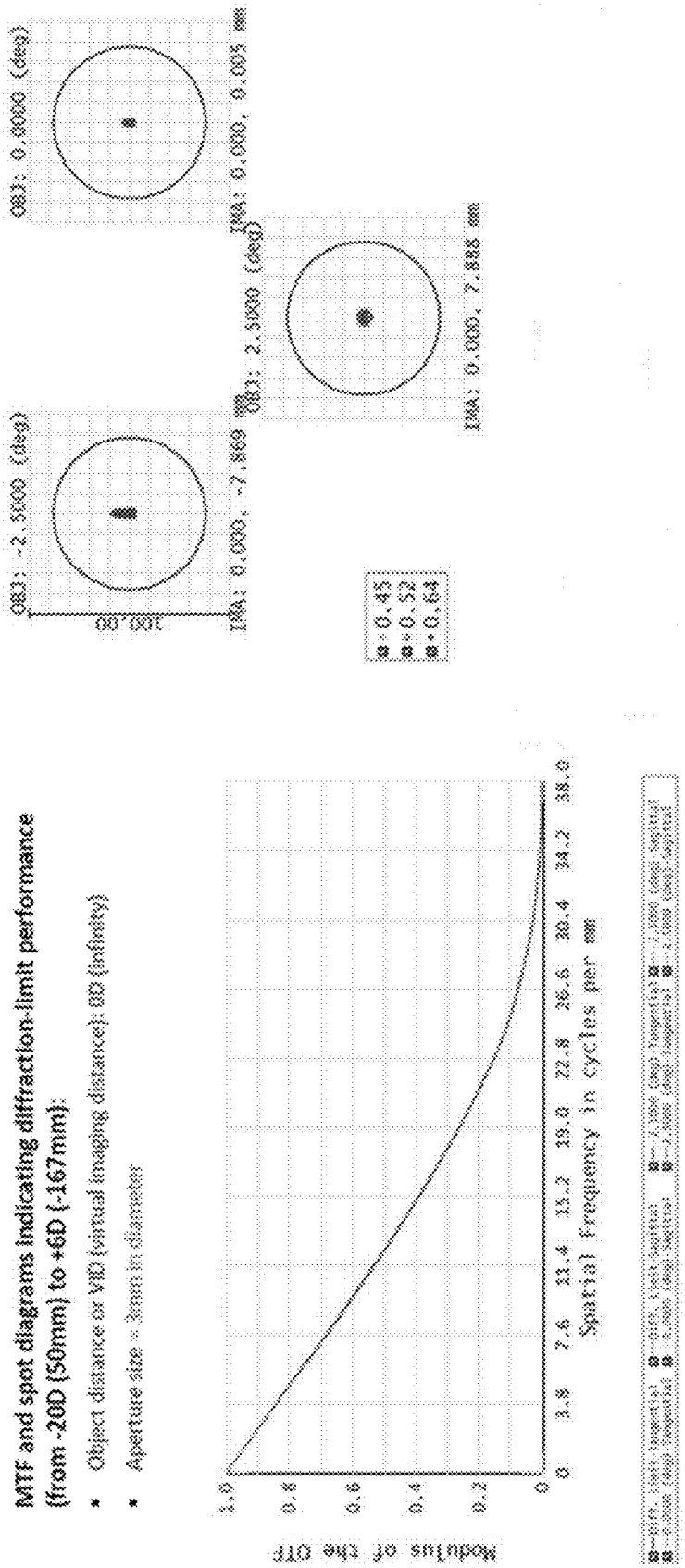
FIG. 20 is a diagram depicting the MTF and spot diagrams with Airy disc (black circles) indicating diffraction-limit performance at D=30 mm, VID=0 D and aperture=3 mm in diameter, of a present optical system.
Figure 21:
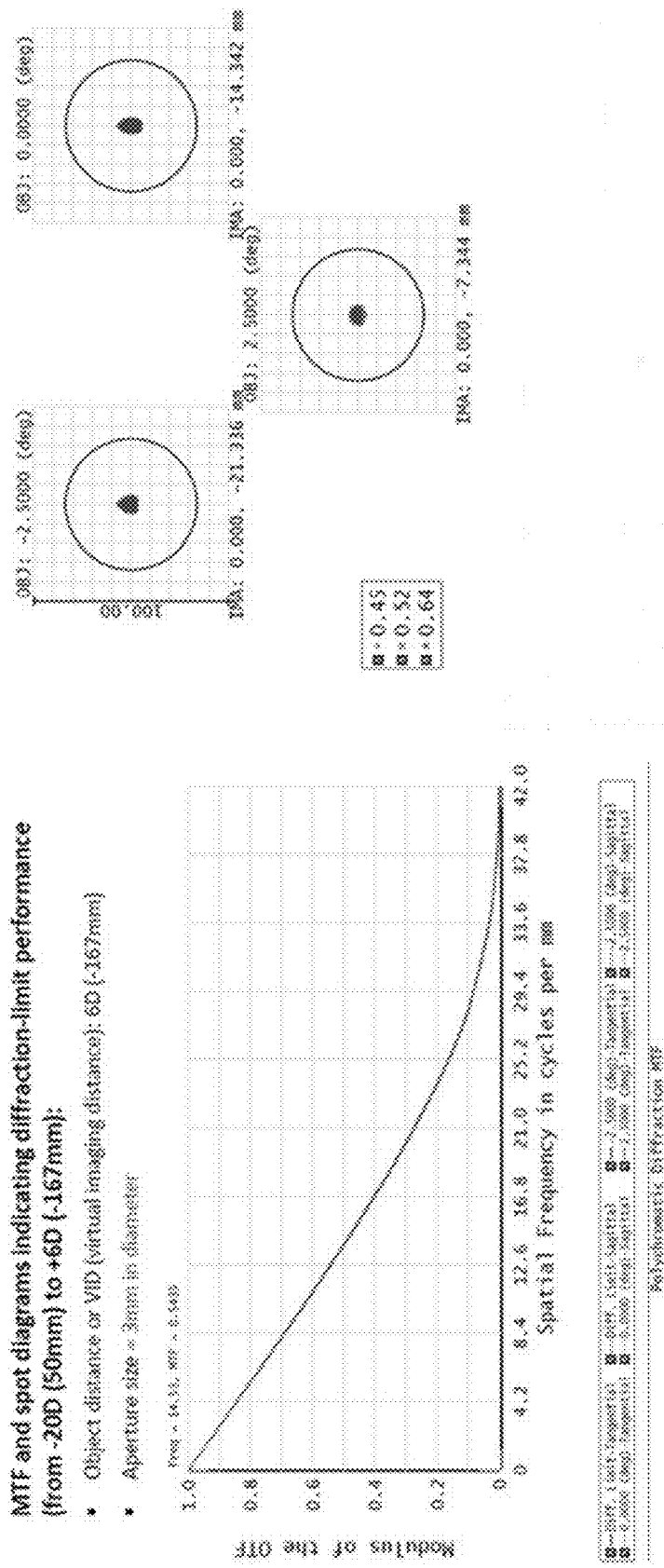
FIG. 21 is a diagram depicting the MTF and spot diagrams with Airy disc (black circles) indicating diffraction-limit performance at D=30 mm, VID=+6 D and aperture=3 mm in diameter, of a present optical system.

FIG. 17 is a diagram depicting the modulation transfer function (MTF) and spot diagrams with Airy disc (black circles) indicating diffraction-limit performance at D=30 mm, VID=−20 D and aperture=3 mm in diameter, of the present optical system. FIG. 18 is a diagram depicting the MTF and spot diagrams with Airy disc (black circles) indicating diffraction-limit performance at D=30 mm, VID=−10 D and aperture=3 mm in diameter, of the present optical system. FIG. 19 is a diagram depicting the MTF and spot diagrams with Airy disc (black circles) indicating diffraction-limit performance at D=30 mm, VID=−6 D and aperture=3 mm in diameter, of a present optical system. FIG. 20 is a diagram depicting the MTF and spot diagrams with Airy disc (black circles) indicating diffraction-limit performance at D=30 mm, VID=0 D and aperture=3 mm in diameter, of a present optical system. FIG. 21 is a diagram depicting the MTF and spot diagrams with Airy disc (black circles) indicating diffraction-limit performance at D=30 mm, VID=+6 D and aperture=3 mm in diameter, of a present optical system. The present optical system is suitable for object-space telecentric imaging with a long VID range or an object distance ranging from at least −20 D to +6 D for 3-mm apertures.

Figure 22:
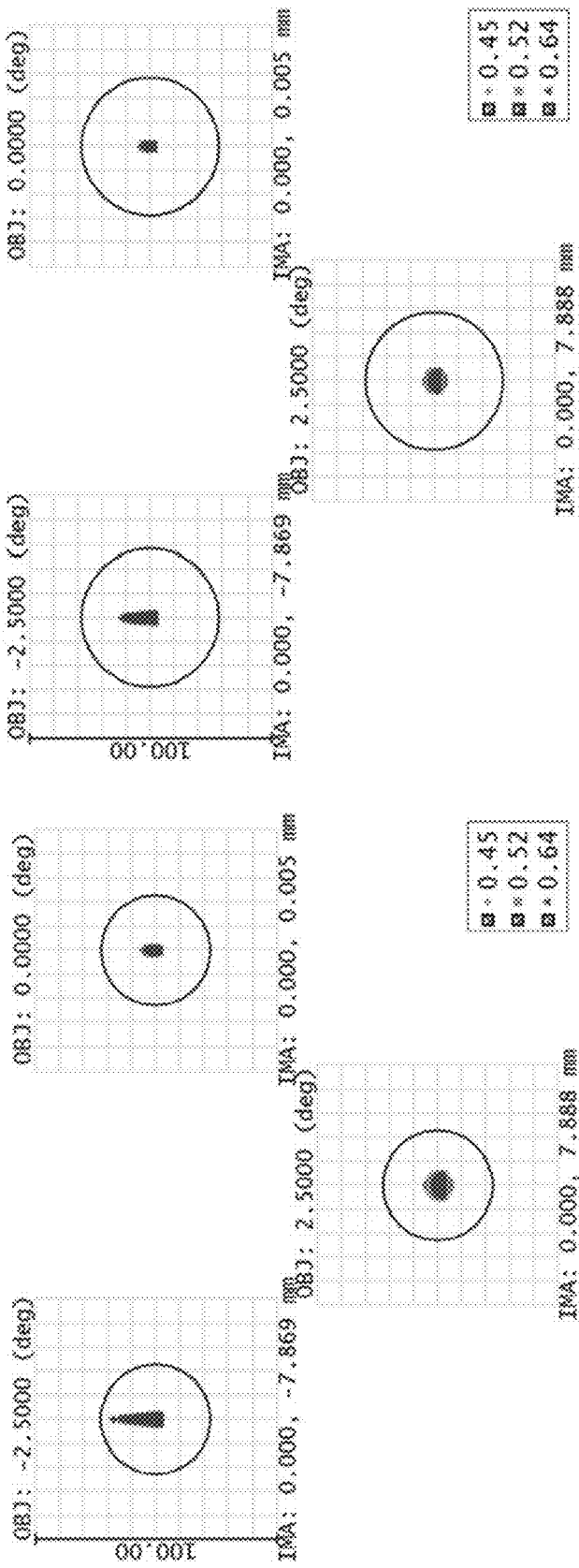
FIG. 22 is a diagram depicting spot diagrams of the present refractive optical system with the object distance or VID at infinity under aperture sizes of 5 mm and 4 mm.
Figure 23:
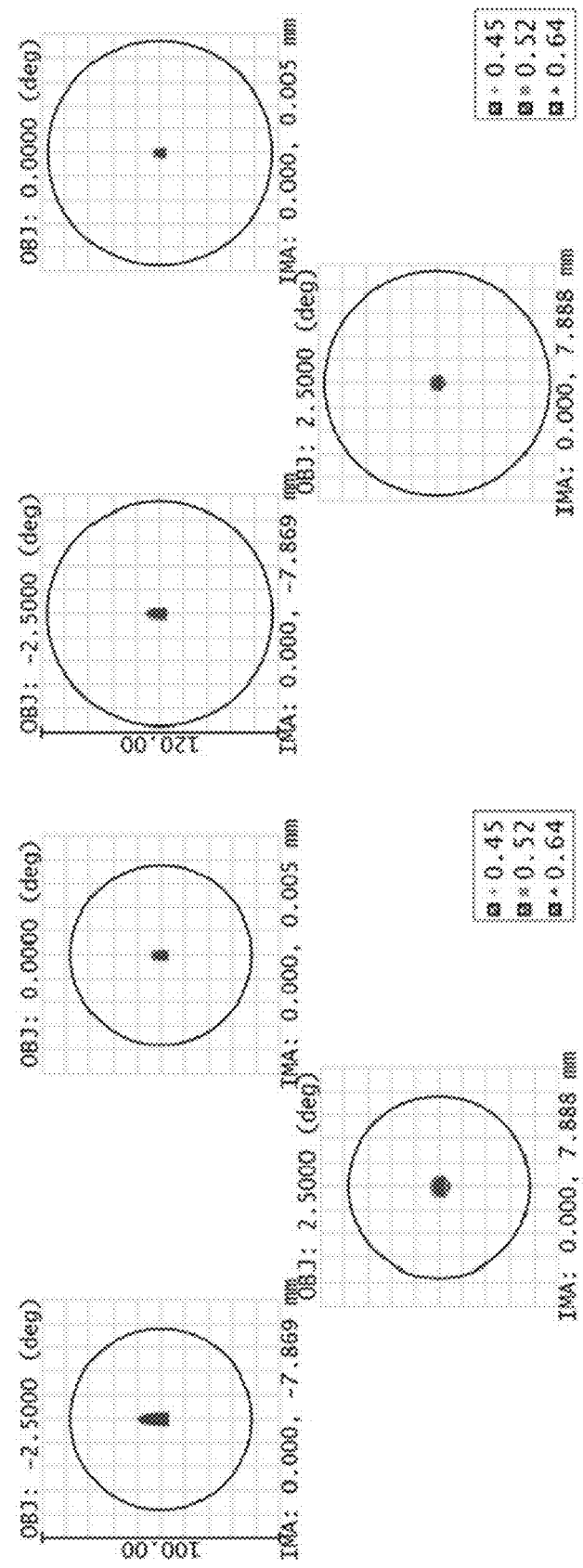
FIG. 23 is a diagram depicting spot diagrams of the present refractive optical system with the object distance or VID at infinity under aperture sizes of 3 mm and 2 mm.

FIG. 22 is a diagram depicting spot diagrams of the present refractive optical system with the object distance or VID at infinity under aperture sizes of 5 mm and 4 mm. FIG. 23 is a diagram depicting spot diagrams of the present refractive optical system with the object distance or VID at infinity under aperture sizes of 3 mm and 2 mm. It shall be noted that the diffraction-limited performance under the various aperture sizes is important for XR metrology, to match the variable pupil sizes of human eyes.

FIG. 24 is a table summarizing various parameters under which the performance of the present refractive optical system remains diffraction-limited. It shall be noted that the VID number sign in diopter is reversed compared to mm, since it is convenient to do so, for calculations associated with measurements of DUTs with additional prescriptions or corrective lenses. The EPE area or whole eye box of XR devices is normally less than about 30 mm in diameter, so the 0-30 mm aperture distance or IPD is sufficient for the EPE device measurements. At VID=−167 mm, the imaging plane is close to the rear lens element, so it limits the negative VID range which can be extended by re-optimization of the optical system. In addition to the diffraction-limited angular resolution, the optical system also has diffraction-limited MTF performance under various apertures, e.g., from about 2 mm to about 5 mm, a size which matches the human eye pupil size and across the long range of VIDs from at least −10 D to +6 D. The 3-mm aperture is the most used one for various measurements in VR metrology. Therefore, it shall be understood then that the present optical lens system can be used for MTF measurements in addition to parallelism measurements.

Figure 25:
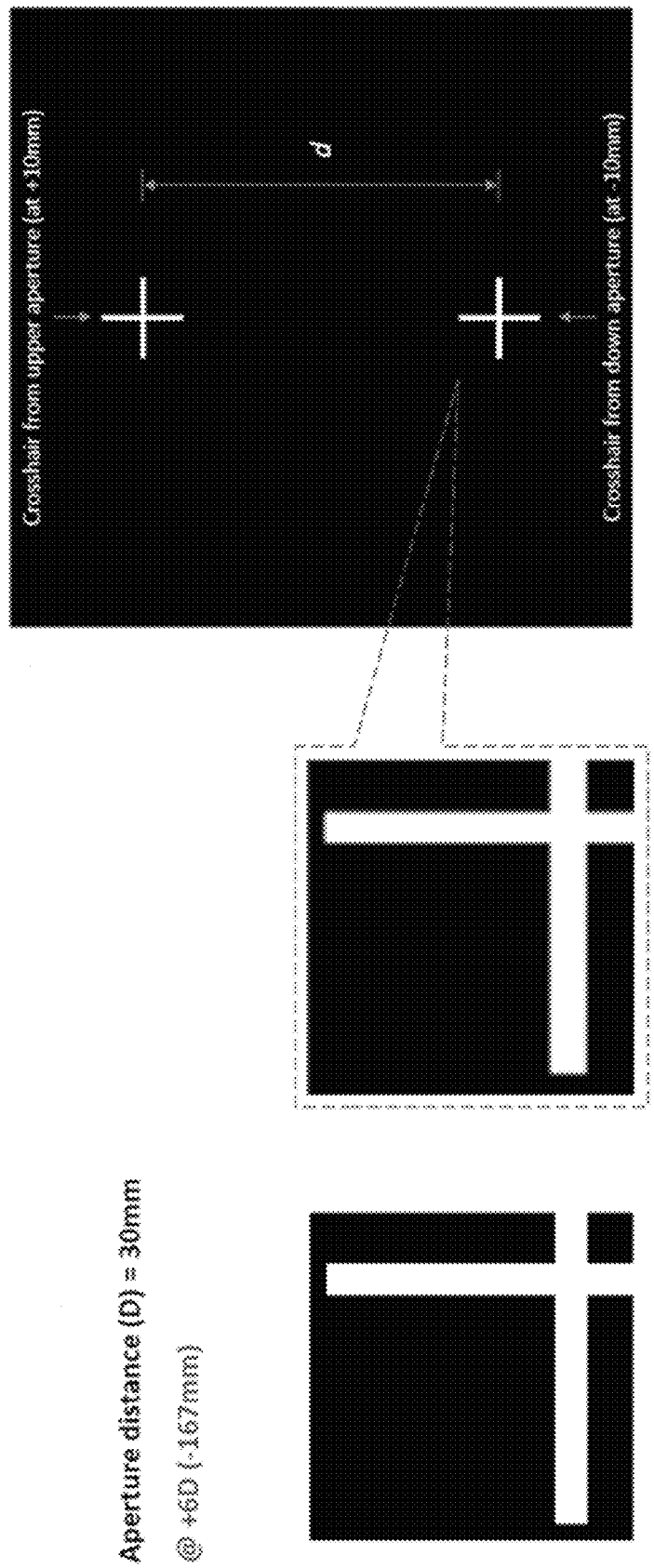
FIG. 25 depicts imaging results of a crosshair object at −167 mm (+6 D) VID after passing through the present refractive optical system.
Figure 26:
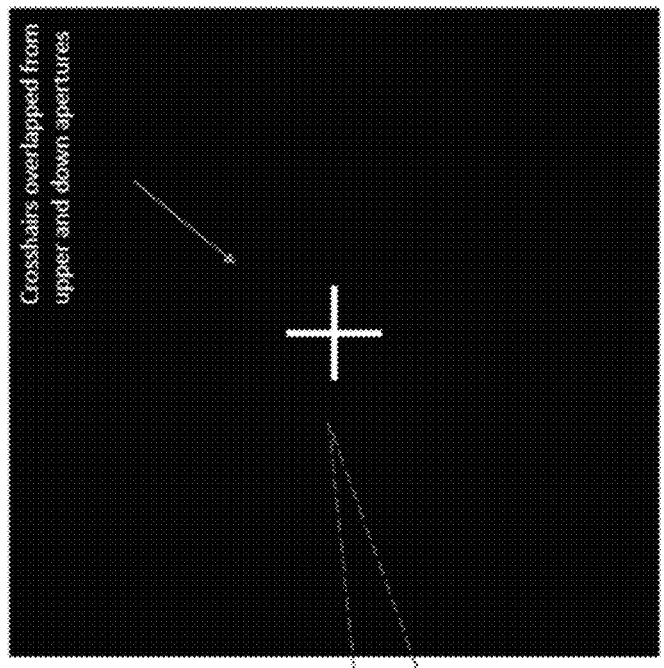
FIG. 26 depicts imaging results of a crosshair object at infinity (0 D) VID after passing through the present refractive optical system.
Figure 26:
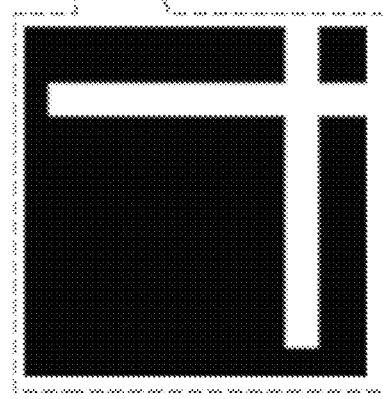
Figure 26:
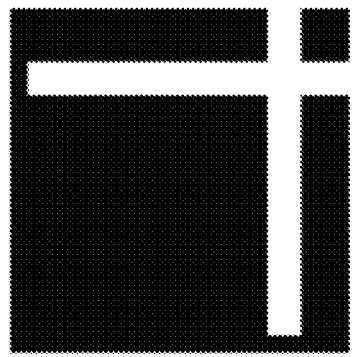
Figure 27:
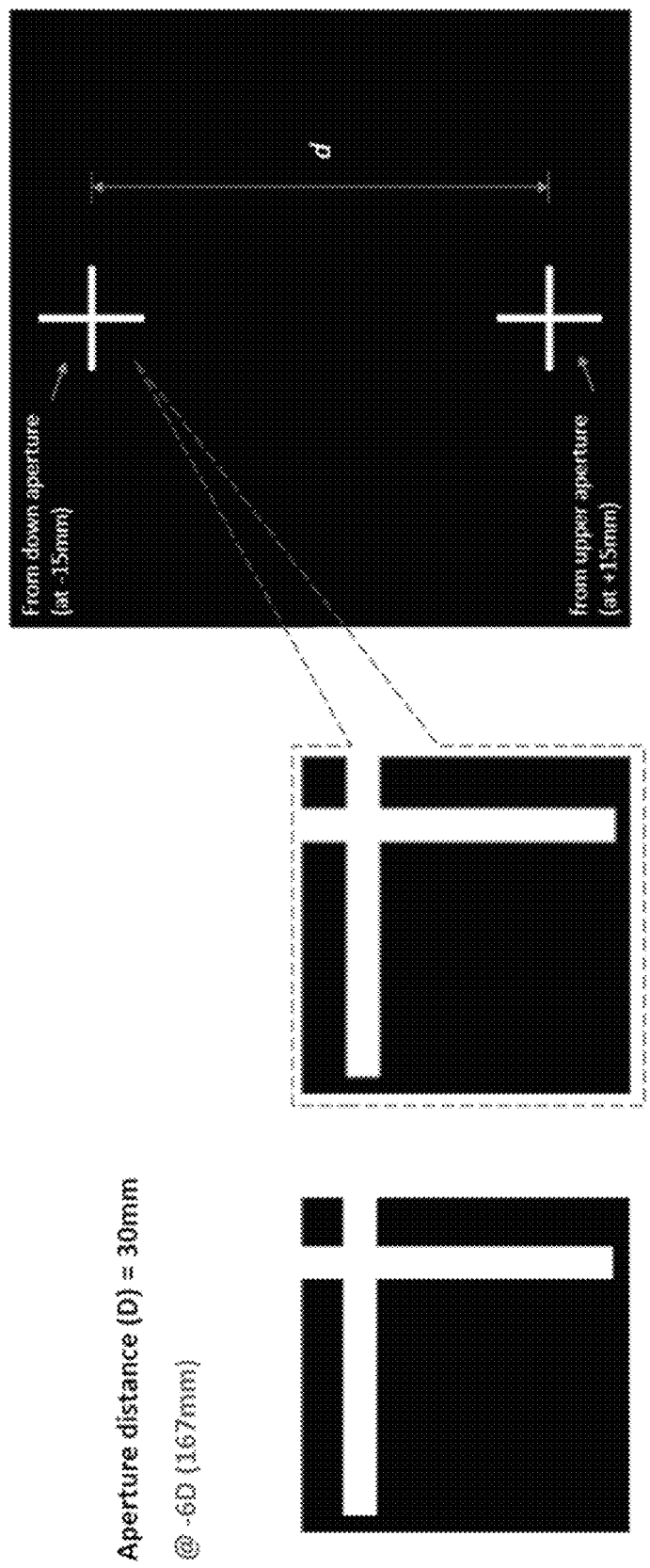
FIG. 27 depicts imaging results of a crosshair object at +167 mm (−6 D) VID after passing through the present refractive optical system.

FIG. 25 depicts imaging results of a crosshair object at −167 mm (+6 D) VID after passing through the present refractive optical system. FIG. 26 depicts imaging results of a crosshair object at infinity (0 D) VID after passing through the present refractive optical system. FIG. 27 depicts imaging results of a crosshair object at +167 mm (−6 D) VID after passing through the present refractive optical system. It shall be noted that the size of the crosshair object corresponds to a 5-degree full field angle and the imaging results are very sharp across the FOV due to the diffraction-limit performance of the refractive optical system.

Figure 29:
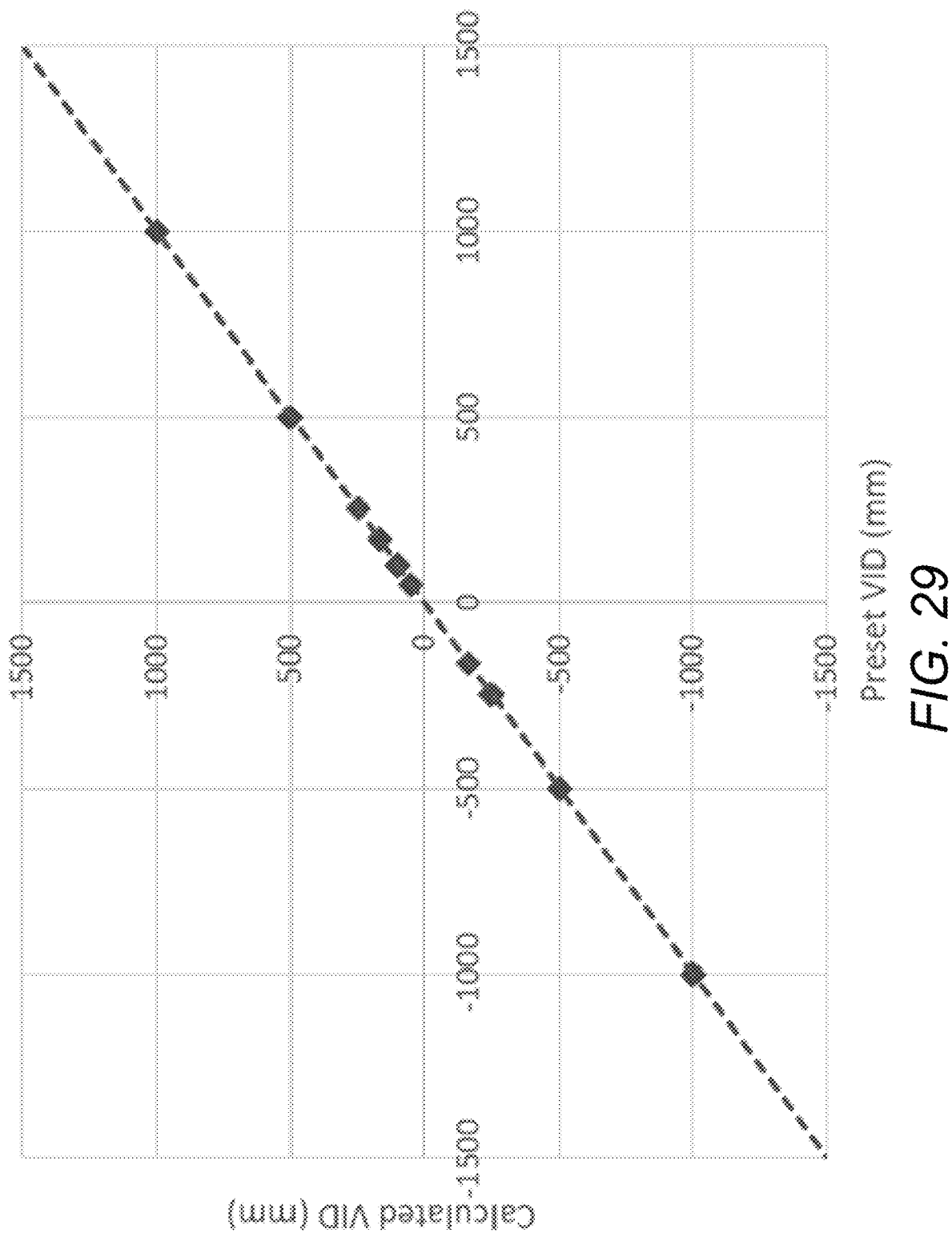
FIG. 29 depicts a curve plotted using measurement results of object distances or VIDs vs. preset values, as shown in FIG. 28.

FIG. 28 depicts measurement results of object distances or VIDs compared to preset values. In addition to angular measurements for EPE devices, the proposed refractive optical system can also be used to measure the VID or object distances which are some of the most important parameters for XR devices and applications. Using Equation (1) defined elsewhere herein and f=179.882 mm, δ=9.533 degrees, L=158.44 mm (from the aperture to the front principal plane 12), EFL=179.882, the offset (Δ) of the imaging plane from the lens system focus position can be calculated based on Equation (2) defined elsewhere herein and the measured d values, where the aperture diameter is 3 mm. The VIDs can be calculated using Equation (5) defined elsewhere herein, based on the above measurements. It can be seen that the calculated results based on the measurements are very accurate compared to the preset VID values. FIG. 29 depicts a curve plotted using measurement results of object distances or VIDs vs. preset values, as shown in FIG. 28. The dash line is a linear trendline. It shall be noted that the preset VID values are aligned extremely well with the calculated results based on the measurements. The results demonstrate that the present optical system is useful for precisely measuring VIDs based on the lateral offset (d). By contrast, conventional methods always use longitudinal offsets including refocusing methods, interference methods or wavefront measurements.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An optical system for measuring a parallelism of light rays of a light emitter and virtual imaging distances (VIDs) of the light emitter, said optical system comprising:
   (a) an enclosure comprising a front end and a rear end;
   (b) a pair of apertures configured to be disposed on a front plane on said front end of said enclosure; and
   (c) a single optical lens system disposed between said front end and said rear end of said enclosure,
wherein a first aperture of said pair of apertures is configured to allow a first set of light rays into said enclosure to enter through a front face of said single optical lens system and to exit through a rear face of said single optical lens system to be cast on an imaging plane as a first spot and a second aperture of said pair of apertures is configured to allow a second set of light rays into said enclosure to enter through the front face of said single optical lens system and to exit through the rear face of said single optical lens system to be cast on the imaging plane as a second spot, the imaging plane being parallel to said front plane, wherein a parallelism of the first set of light rays with respect to the second set of light rays is based on a correspondence of a distance between said first spot and said second spot with a distance between the first set of light rays and the second set of light rays and a VID of the light emitter is based at least in part on an offset of the imaging plane from the focus position of said single optical lens system when the light emitter is not optically disposed at infinity.

2. The optical system of claim 1, wherein said single optical lens system comprises two singlets and two doublets and an optical path configured to be formed in an order of a first of said two singlets, said two doublets and a second of said two singlets.

3. The optical system of claim 1, wherein said imaging plane is an imaging plane of an image capture device.

4. The optical system of claim 1, wherein the light emitter is a waveguide.

5. The optical system of claim 4, wherein the waveguide is an exit pupil expansion device.

6. The optical system of claim 1, said image capture device comprises a controller configured to receive an image of said first spot and said second spot, wherein said controller is configured to determine if said first spot and said second spot are disposed on a central plane of said optical system and a distance between said first spot and said second spot corresponds with a distance between the first set of light rays and the second set of light rays, if at least one of said first spot and said second spot is not disposed on said central plane, the first set of light rays and the second set of light rays are not disposed in parallel and if said distance between said first spot and said second spot does not correspond with said distance between the first set of light rays and the second set of light rays, the first set of light rays and the second set of light rays are not disposed in parallel.

7. The optical system of claim 1, at least one of the first set of light rays and the second set of light rays comprises a crosshair shape embodied in at least one of said first spot and said second spot such that an angular deviation of at least one of the first set of light rays the second set of light rays is discernible on the imaging plane.

8. The optical system of claim 1, wherein said single optical lens system is configured to be object-space telecentric.

9. The optical system of claim 1, wherein the first set of light rays and the second set of rays of the light emitter cause virtual imaging distances and object distances ranging from −20 D to +6 D (50 mm to −167 mm).

* * * * *